United States Patent
Takase et al.

(10) Patent No.: US 7,908,390 B2
(45) Date of Patent: Mar. 15, 2011

(54) PACKET FORWARDING APPARATUS USING TOKEN BUCKET ALGORITHM AND LEAKY BUCKET ALGORITHM

(75) Inventors: Masayuki Takase, Kokubunji (JP);
Yoshihiro Ashi, Yokohama (JP);
Masahiko Mizutani, Kokubunji (JP);
Tohru Kazawa, Kokubunji (JP);
Kenichi Sakamoto, Kokubunji (JP);
Taishi Shinagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 11/341,683

(22) Filed: Jan. 30, 2006

(65) Prior Publication Data
US 2006/0268719 A1 Nov. 30, 2006

(30) Foreign Application Priority Data

May 26, 2005 (JP) .................. 2005-154047

(51) Int. Cl.
*G06F 15/16* (2006.01)
*G06F 15/173* (2006.01)
(52) U.S. Cl. .......... 709/232; 709/223; 709/226; 709/233
(58) Field of Classification Search .................. None
See application file for complete search history.

(56) References Cited

U.S. PATENT DOCUMENTS

| | | | | |
|---|---|---|---|---|
| 6,247,061 B1 * | 6/2001 | Douceur et al. | ............. | 709/240 |
| 6,628,609 B2 * | 9/2003 | Chapman et al. | ............. | 370/229 |
| 6,741,552 B1 * | 5/2004 | McCrosky et al. | ............ | 370/218 |
| 7,042,848 B2 * | 5/2006 | Santiago et al. | ............. | 370/253 |
| 7,149,184 B2 * | 12/2006 | Takada et al. | ................. | 370/230 |
| 7,339,890 B2 * | 3/2008 | Burns | ........................ | 370/230.1 |
| 7,403,518 B2 * | 7/2008 | Tsuchida et al. | ............. | 370/389 |
| 2001/0014081 A1 | 8/2001 | Kawasaki et al. | | |
| 2003/0123390 A1 | 7/2003 | Takase et al. | | |
| 2004/0038685 A1 | 2/2004 | Nakabayashi | | |
| 2004/0221032 A1 * | 11/2004 | Bernstein et al. | ............. | 709/224 |

FOREIGN PATENT DOCUMENTS

| | | |
|---|---|---|
| JP | 2000-101639 | 1/1990 |
| JP | 10-135957 | 10/1996 |
| JP | 2001-197110 | 1/2000 |
| JP | 2001-230810 | 2/2000 |
| JP | 2003-198611 | 12/2001 |
| JP | 2005-510957 | 11/2002 |

(Continued)

OTHER PUBLICATIONS

Bernet et al, RFC:3290 An Informational Management Model for Diffserv Routers, May 2002, IETF, pp. 20-22 and 50-55.*

(Continued)

*Primary Examiner* — Krista M. Zele
*Assistant Examiner* — Matthew S Lindsey
(74) *Attorney, Agent, or Firm* — Stites & Harbison, PLLC; Juan Carlos A. Marquez, Esq

(57) ABSTRACT

A packet forwarding apparatus and network system for providing different types of bandwidth control services to the user; in which a packet forwarding apparatus for transferring data comprises an interface unit for sending and receiving packets, and a traffic shaper for controlling the packet transmission timing and a packet switch for sending an output to the interface unit as the destination of the received packet; and the traffic shaper uses a token bucket algorithm when transmitting a packet to guarantee the minimum frame rate, and uses a leaky bucket algorithm when limiting the peak frame rate.

28 Claims, 22 Drawing Sheets

FOREIGN PATENT DOCUMENTS

| | | |
|---|---|---|
| JP | 2004-112780 | 8/2003 |
| JP | 2004-289806 | 1/2004 |
| WO | WO 03/047179 A1 | 11/2002 |

OTHER PUBLICATIONS

Chimento, P.F., "Standard Token Bucket Terminology", May 18, 2000, pp. 1-2.

"Traffic Management Specification Version 4.0," ATM Forum Technical Committee, pp. 21-24.

Chimento, P.F., "Standard Token Bucket Terminology", http://qbone.internet2.edu/bb/Traffic.pdf, May 18, 2000, pp. 1-2.

Partridge, Craig, "Fundamentals and Application of Ultra-high Speed Multimedia Networking", Gigabit Networking, Addison-Wesley Professional Computing Series, pp. 1-11 in Japanese with English Translation.

Toda, Iwao, "Detailed Explanation-Network QoS Technology", Ohmasha, May 25, 2001, pp. 1-6, in Japanese with English Translation.

Tetsuya Yokotani et al., "Technical Trend and Future Issues in Optical Access Networks", IECE Technical Report, vol. 104, No. 73, the Institute of Electronics, Information and Communication Engineers, Technical Report of IEICE, in May 14, 2004, pp. 25-30.

* cited by examiner

| MODE | MFR CONTROL FLAG | PFR CONTROL FLAG | BE CONTROL FLAG |
|---|---|---|---|
| 1 | 0 | 0 | 1 |
| 2 | 1 | 0 | 0 |
| 3 | 1 | 1 | 0 |
| 4 | 1 | 0 | 1 |
| 5 | 0 | 1 | 0 |

OPERATION MODE CONTROL TABLE

*FIG. 7*

| MFR PRIORITY FLAG | PFR VALID/INVALID FLAG | TOKEN QUANTITY DECISION FLAG | DECISION RESULT FLAG |
|---|---|---|---|
| 1 | - | - | 1 |
| 0 | 0 | - | 1 |
| 0 | 1 | 1 | 1 |
| 0 | 1 | 0 | 0 |

PFR COMPLIANCE TABLE

FIG. 8

PACKET FORWARDING APPARATUS USING TOKEN BUCKET ALGORITHM AND LEAKY BUCKET ALGORITHM

CLAIM OF PRIORITY

The present application claims priority from Japanese patent application P2005-154047 filed on May 26, 2005, the content of which is hereby incorporated by reference into this application.

FIELD OF THE INVENTION

The present invention relates to a packet forwarding node and relates in particular to bandwidth control technology ideal for packet forwarding nodes comprising an optical interface.

BACKGROUND OF THE INVENTION

Recent advances in network technology are creating a shift in network access away from narrow band access services such as dialup, and towards broadband access services such as FFTH (Fiber To The Home). Along with this shift, an increasing number of applications require real time operation (streaming, VoIP, net-banking, etc.) rather than applications (mail, World Wide Web, data transmission) that are not greatly affected by changes in communication bandwidth. The demand for a network with a stable communication bandwidth is increased because of this change.

However in current network services, multiple users share the bandwidth in a best efforts type (throughput is not guaranteed) situation. Providing a stable bandwidth is therefore difficult and network services cannot always cope with real time network applications. This situation has created a demand for network services that offer use of different bandwidths by contract.

To achieve this type of bandwidth control, traffic shaping using the leaky bucket algorithm has been proposed to guarantee the bandwidth for variable length packet communication that is currently most often used on networks.

According to technology disclosed in JP 2003-198611 A, thresholds expressing the MFR (minimum frame rate) (MFR refers to minimum guaranteed bandwidth) and the PFR (peak frame rate) (PFR refers to maximum allowable bandwidth) are set on the leaky bucket. This technology allows holding packets and sending packets from queues whose packets are lower than the minimum frame rate. This technology also allows sending packets from queues whose packets are below peak frame rate when surplus bandwidth is available. Sending frames is prohibited from queues whose packet level exceeded the peak frame rate regardless of the packets. This method can therefore control the minimum frame rate and peak frame rate.

The text, "Standard Token Bucket Terminology" by P. F. Chimento describes the token bucket operating principle. Also, Section 4.4.2 of the "Traffic Management Specification Version 4.0" by the ATM Forum Technical Committee describes the leaky bucket operating principle.

SUMMARY OF THE INVENTION

However in the related art, when the network became congested, users using empty band space to send data greater than the minimum frame rate were unable to send packets until their level dropped below the minimum frame rate. The related art therefore had the problem of being unable to maintain a minimum frame rate in that period.

A first object of this invention is to provide a packet forwarding node including a bandwidth control unit providing service combining a best efforts service, a contract guaranteed bandwidth service, and a peak frame rate control service. This object of the invention will in particular resolve problems in technology disclosed in JP 2003-198611 A in best efforts services, or that did not provide combinations of contract guaranteed bandwidth services and best efforts services using empty bandwidth.

A second object of the invention is to provide a traffic shaper also adaptable to base side devices for indoor station PON systems providing FTTH access services that are spreading widely in recent years.

According to the an aspect of this invention, there is provided a packet forwarding node for transmitting data and network system including an interface unit for sending and receiving packets, and a traffic shaper unit for controlling the packet transmission timing and a packet switch for sending an output to the interface unit as the destination of the received packet; and the traffic shaper unit uses a token bucket algorithm when transmitting a packet to guarantee the minimum frame rate, and uses a leaky bucket algorithm when limiting the peak frame rate According to the aspect of this invention, it is capable of strictly controlling the bandwidth by using a leaky bucket algorithm when limiting peak frame rate and by using a token bucket algorithm to guarantee the minimum frame rate.

BRIEF DESCRIPTION OF THE DRAWINGS

The present invention can be appreciated by the description which follows in conjunction with the following figures, wherein:

FIG. 7 is a drawing of the operation mode control table of the first embodiment;

FIG. 8 is a drawing showing the PFR compliance table of the first embodiment;

DESCRIPTION OF THE PREFERRED EMBODIMENTS

First Embodiment

Figure 1:
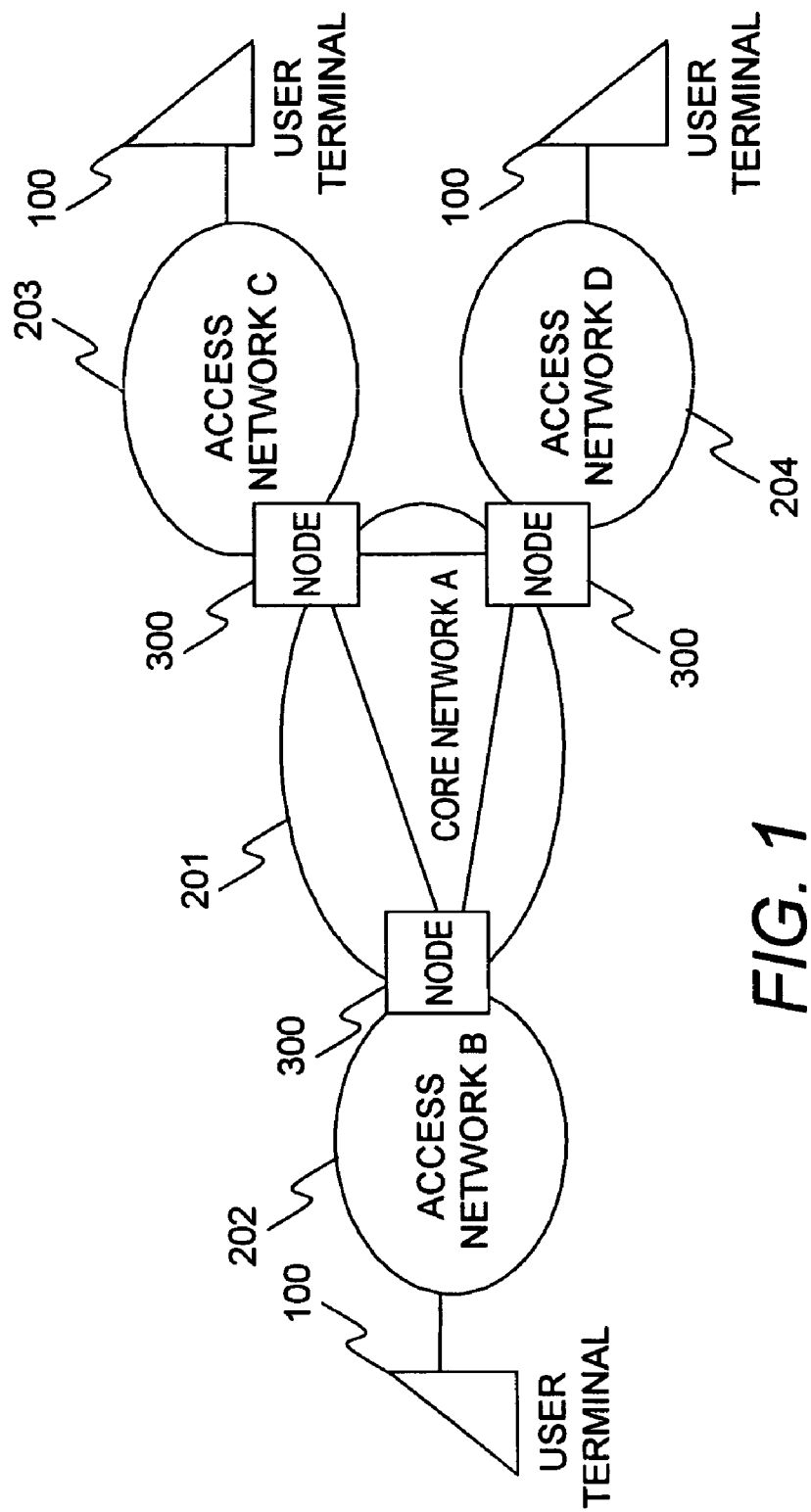
FIG. 1 is a concept view of the network system of the first embodiment.

FIG. 1 is a concept view of the network system of the first embodiment of this invention.

The network system of the first embodiment includes a core network A201, an access network B202, an access network C203 and an access network D204. The core network A201 and the access networks B202 C203 and D204 are an optical fiber network.

A network node 300 connects the access network B202, access network C203 and the access network D204, with the core network A201. A user terminal 100 connects to the access networks B202 through D204.

Figure 2:
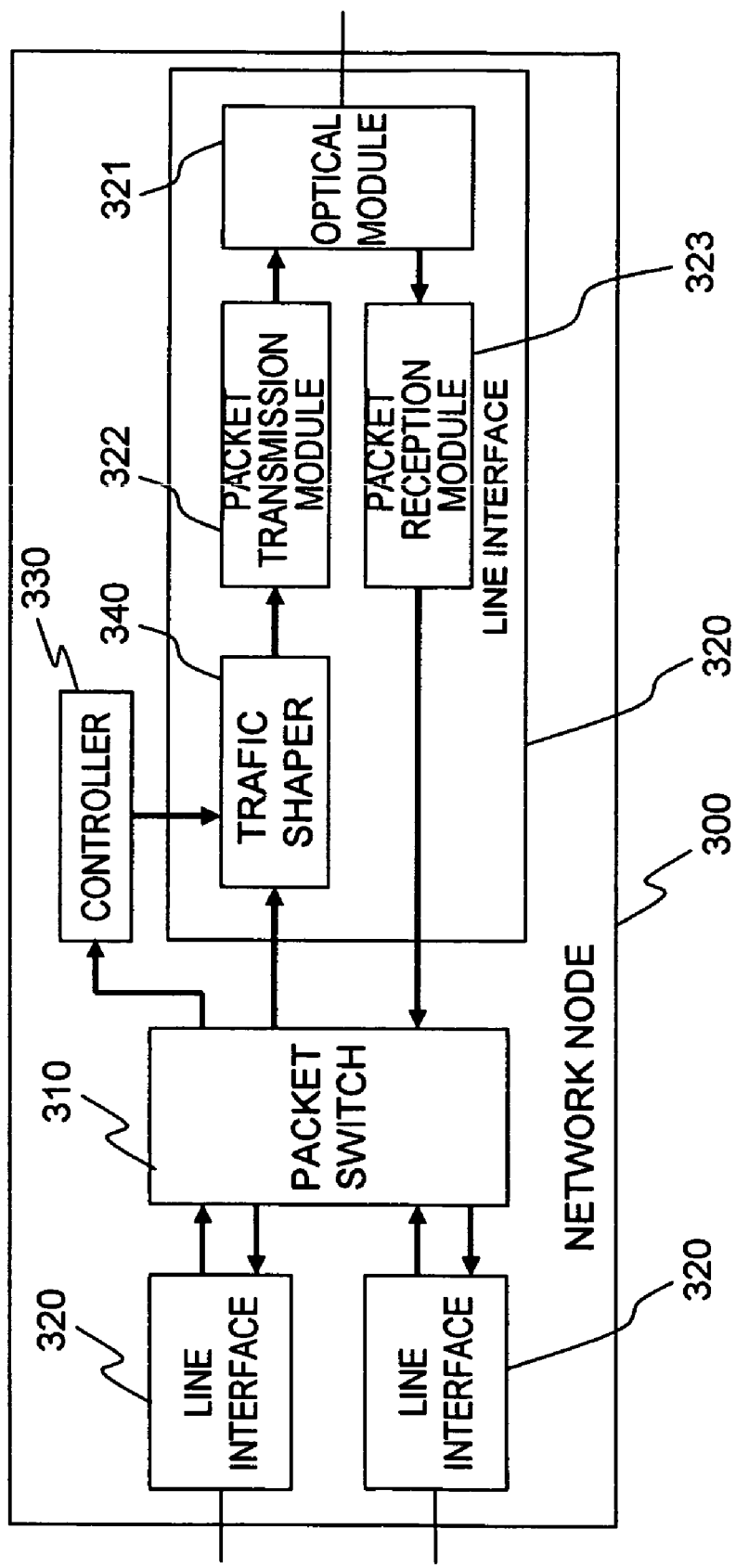
FIG. 2 is a block diagram of the network node 300 of the first embodiment.

FIG. 2 is a block diagram of the network node 300 of the first embodiment of this invention.

The network node 300 includes a packet switch 310, multiple line interfaces 320 and controllers 330.

The packet switch 310 decides the destination of the packet that the line interface 320 received and sends received packet to the transmit line interface 320.

The line interface 320 includes an optical module 321, a packet transmission module 322, and a packet receiving module and traffic shaper 340.

The traffic shaper 340 sets the packet transmission timing. The line interface 320 of this embodiment comprises a traffic shaper 340. However the traffic shaper 340 may be installed separately from the line interface 320 (i.e. traffic shaper 340 may be installed in a prestage of line interface 320).

The optical module 321 is a optical-electrical converter at the termination of the optical fiber network. The optical module 321 receives an optical signal sent from the network A201 and generates an electrical signal by optical-electrical conversion. The optical module 321 sends the optical signal on the network A201 at the specified timing.

The packet transmission module 323 sends the packet at the timing set by the traffic shaper 340.

The packet receiving module 322 extracts the packet from the optical signal received by optical module 321 and sends extracted packet to the packet switch 310.

The controller 330 sets each threshold value, turns each operation mode ON or OFF (valid or invalid) used in the traffic shaper 340 and sends those settings to the traffic shaper 340.

Figure 3:
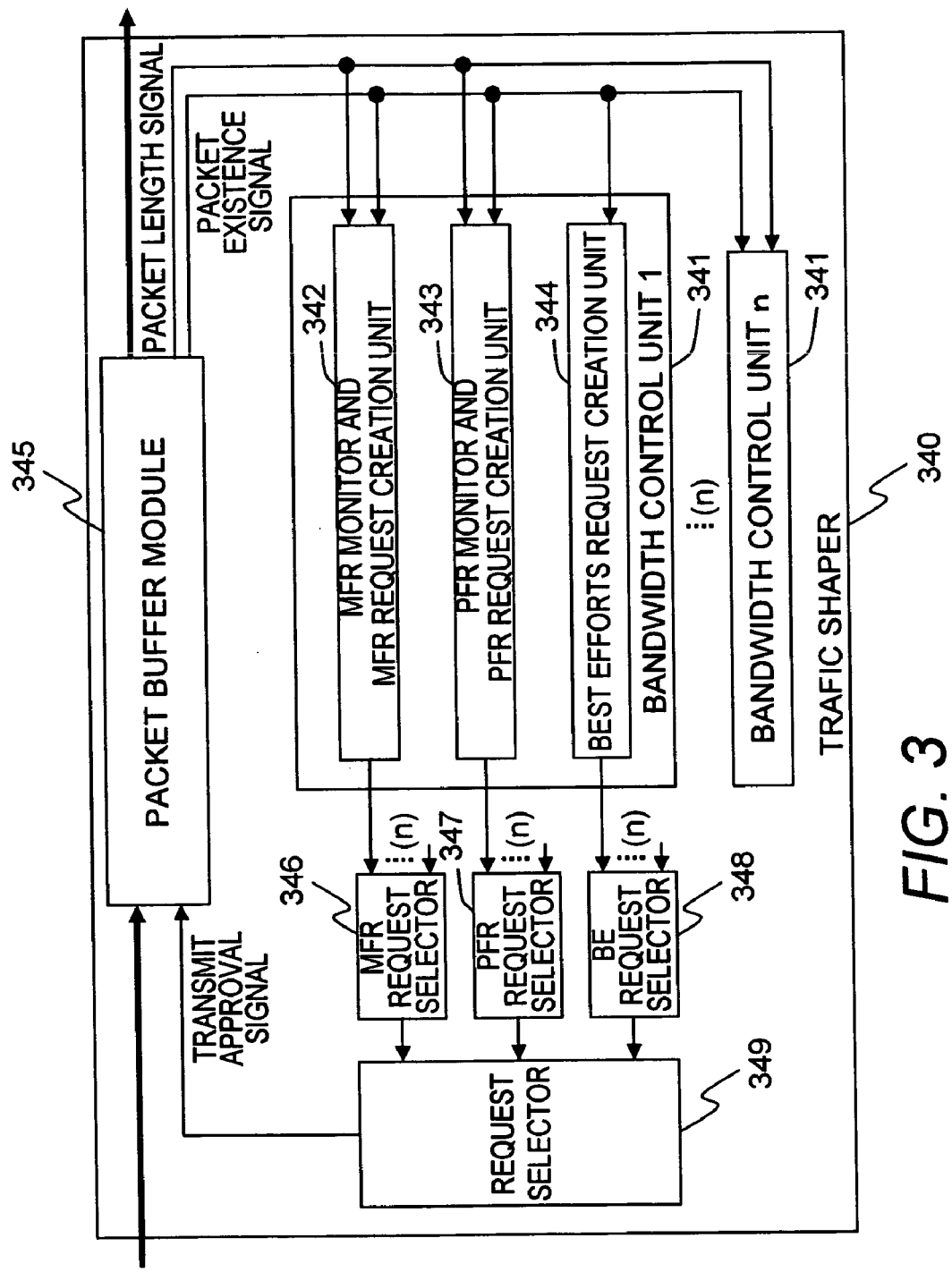
FIG. 3 is a block diagram of the traffic shaper of the first embodiment.

FIG. 3 is a block diagram of the traffic shaper 340 of the first embodiment of this invention.

The traffic shaper 340 comprises multiple bandwidth controllers 341, a packet buffer module 345, a MFR request selector 346, a PFR request selector 347, a BE request selector 348 and request selector 349.

The traffic shaper 340 may be made up of hardware in view of the processing speed or may be made up of software.

The packet buffer module 345 includes multiple queues for storing data that is input. The packet buffer module 345 uses a transmit approval signal from the request selector 349 to approve reading data stored in the queue.

The packet buffer module 345 judges the packet length read from the queue, and outputs a packet length signal to the corresponding bandwidth controller 341 that will send the packet. The packet buffer module 345 also output a packet existence signal to the bandwidth controller 341 for showing whether or not a packet is stored in the queue. The packet buffer module 345 sets the packet existence signal to "1" if a packet is stored in the corresponding queue, and "0" if no packet is stored in the corresponding queue.

A bandwidth controller 341 is provided corresponding to each of the queue included in the packet buffer module 345 and controls the packet transmission from each queue. The bandwidth controller 341 comprises a MFR monitor and MFR request creation unit 342, a PFR monitor and PFR request creation unit 342 and a best efforts request creation unit 344. The bandwidth controller 341 controls the packet transmission timing according to a control algorithm provided by each creation unit.

The MFR request selector 346 selects one signal from the MFR monitor and MFR request creation unit 342 of the multiple bandwidth controllers 341. The MFR request selector 346 may select signals in sequence from the bandwidth controllers 341 using the round robin or another method. The MFR request selector 346 then sends a packet transmission request for the queue for the selected bandwidth controller 341 to the request selector 349.

The PFR request selector 347 selects one signal from the PFR monitor and PFR request creation unit 343 of the multiple bandwidth controllers 341. The PFR request selector 347 may select signals in sequence from the bandwidth controllers 341 using the round robin method or another method. The PFR request selector 347 then sends a packet transmission request for the queue for the selected bandwidth controller 341 to the request selector 349.

The BE request selector 348 selects one signal from the best efforts request creation unit 344 of the multiple bandwidth controllers 341. The BE request selector 348 may select signals in sequence from the bandwidth controllers 341 using the round robin or another method. The BE request selector 348 then sends a packet transmission request for the queue for the selected bandwidth controller 341 to the request selector 349.

After receiving a packet transmission request from the MFR request selector 346, the PFR request selector 347, or the BE request selector 348, the transmission request selector 349 selects any one of those packet transmission requests and sends a transmit approval signal instructing, which queue among the packet buffer module 345 multiple queues may be sent. The order of priority for packet transmission requests preferably sets the MFR request selector 346, the PFR request selector 347, or the BE request selector 348 in order of high priority, and does not allow selective low priority transmission requests when there is a high priority packet transmission request.

Figure 4:
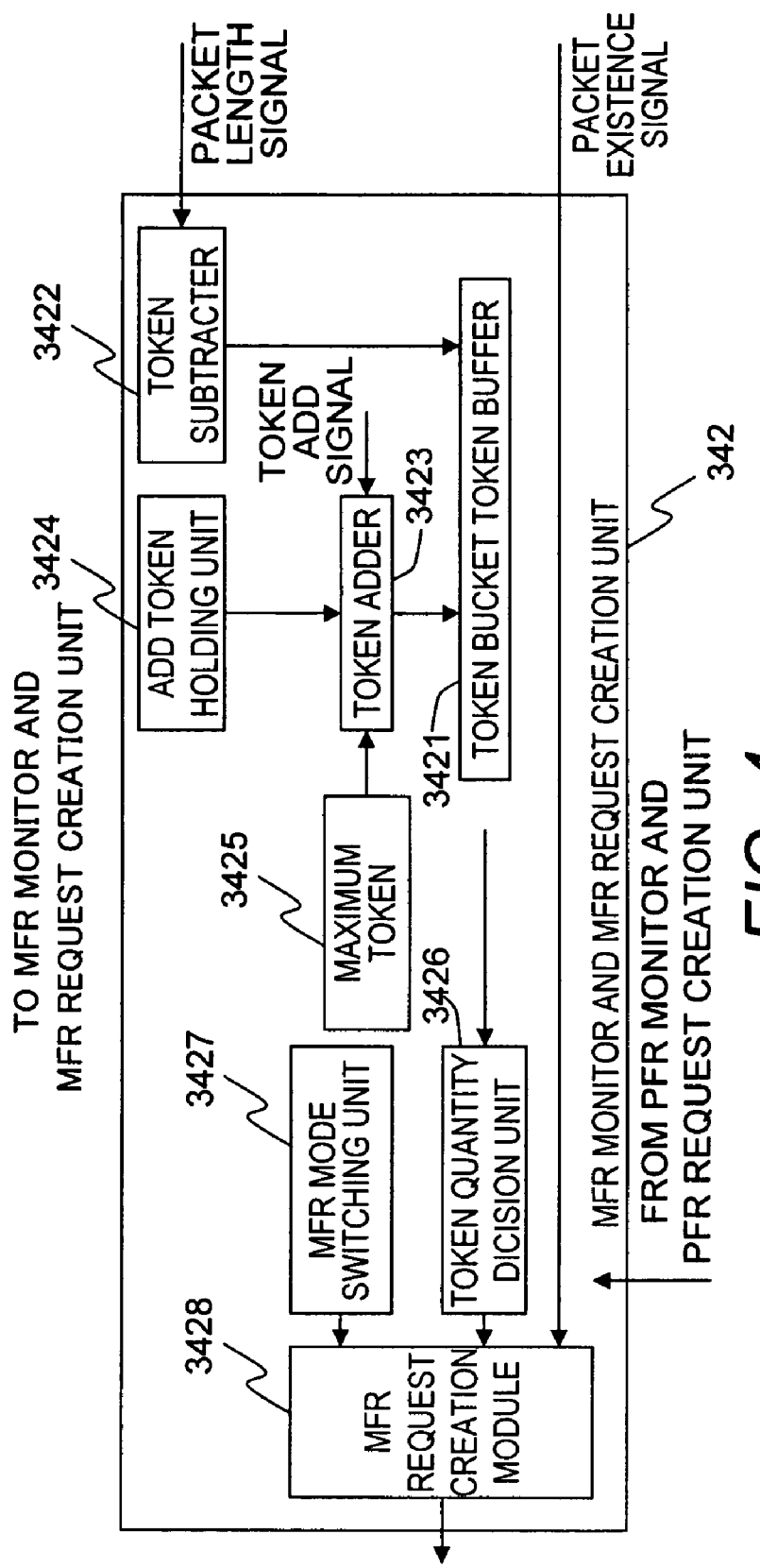
FIG. 4 is a block diagram of the MFR monitor and MFR request creation unit of the first embodiment.

FIG. 4 is a block diagram of the MFR monitor and MFR request creation unit 342 of the first embodiment of this invention.

The MFR monitor and MFR request creation unit 342 guarantees the minimum allowable bandwidth, and controls the packet transmission timing according to the minimum frame rate. Control guaranteeing the minimum bandwidth is a service provided to guarantee reliable data transfer within a bandwidth specified in a contract between the user and carrier. Whether data in excess of the contract bandwidth can be sent involves applying either a best efforts service or a peak frame rate service. So the token bucket algorithm described in "Standard Token Bucket Terminology" is used when controlling the minimum frame rate.

The token bucket algorithm is mainly used for bandwidth control and expressed by a token bucket for holding the token, and a model for adding a token to that token bucket in fixed cycles.

The token bucket algorithm is described next. In the token bucket algorithm, tokens corresponding to the packet transmission band are added to the token bucket at fixed cycles. When there is a token in the token bucket, packet transmission permission is granted as a means to protect the allowable bandwidth. When a packet is sent, a token equivalent to that packet size is subtracted from the token bucket. The token bucket possesses a function to maintain the tokens at a certain amount.

When the packet cannot be sent for some reason such as transmission of another user's packet, and the packet below the minimum frame rate must be sent in a certain interval, the token bucket algorithm can in this way allow packets to be sent in bursts equal to the token amount held in a buffer when there is available bandwidth. The token packet algorithm is ideal for controlling the minimum frame rate in this way.

However, since packets can be sent in bursts, the token bucket algorithm is not well suited for controlling the peak frame rate.

In the token bucket algorithm, there are two concepts for the timing to allow sending packets. One method is to issue permission to transmit a packet after tokens equal to the packet size accumulate in the token bucket, and then subtract tokens equal in size to the transmitted packet, from the token bucket.

Another method is to issue permission to transmit a packet if the token quantity in the token bucket is larger than zero, and then subtract tokens equal to the size of that transmitted packet, from the token bucket. In this latter method, the token value of the token packet is maintained at a negative value.

Both methods possess largely the same characteristics. This embodiment of this invention uses the latter method for the token bucket. However, the same effects may be achieved by using the former method.

Besides the token bucket algorithm, the leaky bucket algorithm is also used for controlling the bandwidth.

The leaky bucket algorithm is expressed by a model where a token equivalent to the transmitted packet size is added at each packet transmission to a leaky bucket with a hole from which tokens leak out at a fixed quantity.

The leaky bucket algorithm is described next. In the leaky bucket algorithm, tokens matching the packet transmit bandwidth, leak out (are subtracted periodically in predetermined cycles) at a fixed amount. Packets can be sent if the leaky bucket is empty and matches the bandwidth. When a packet has been sent, a token equivalent to the size of the transmitted packet is added to the leaky bucket. Also, the token value of the leaky bucket algorithm is maintained at zero and is not a negative value.

Therefore unlike the token bucket algorithm, packet transmissions in bursts above the bandwidth setting are not allowed even in cases where packets cannot be sent due to some reason such as transmission of another user's packet, and only packets below the bandwidth setting can be sent within a certain period. The leaky bucket algorithm is ideal for controlling the peak frame rate (or peak frame rate) in this way.

The MFR monitor and MFR request creation unit 342 includes a token bucket token buffer 3421 for token buckets, a token subtracter 3422, a token adder 3423, an add token holding unit 3424, a maximum token holding unit 3425, a token quantity decision unit 3426, an MFR mode switching module 3427, and an MRF request creation module 3428.

The token bucket token buffer 3421 holds the parameters (token quantity (TP) accumulated in the token bucket) used by the token bucket algorithm. Tokens accumulated in the token bucket token buffer 3421 are subtracted based on the transmitted packet length and added within a fixed time and fixed quantity.

The token subtracter 3422 subtracts tokens in an amount matching the packet length, from the token bucket token buffer 3421, based on the packet length signal output sent from the packet buffer module 345.

The add token holding unit 3424 holds tokens added periodically in a quantity set by the controller 330. The quantity of tokens to add is set within each queue of the packet buffer module 345, and decided according to each user's minimum frame rate.

The maximum token holding unit 3425 holds the maximum amount of tokens storable in the token bucket token buffer 3421, in a quantity set by the controller 330.

The token adder 3423 adds tokens in predetermined quantities at periodic intervals. More specifically, the token adder 3423 adds the quantity of tokens held in the add token holding unit 3424 when input with a token add signal (i.e. a clock signal). After adding the tokens, the token adder 3423 sets the maximum token holding unit 3425 value into the token bucket token buffer 3421, when the token bucket token buffer 3421 has become larger than the value of maximum token bucket holding unit 3425.

The token quantity decision unit 3426 decides whether or not the token quantity (TP) accumulated in the token bucket token buffer 3421 is positive or negative, and outputs "1" if $TP \geqq 0$, or outputs "0" to the MFR request creation module 3428 if $TP<0$.

The MFR mode switching module 3427 holds MFR mode ON or OFF information set by the controller 330. If the MFR mode is ON then "1", and if the MFR mode is OFF, then "0" is continually output to the MRF request creation module 3428.

The MRF request creation module 3428 totals the logic sums of signals output from the signal output from the MFR mode switching module 3427, the signal output from the token quantity decision unit 3426, and the packet on/off signals output from the packet buffer module 345 and the signal output from the PFR compliance decision unit 3435. The logic sum of the signals is a packet transmission request which is sent to the MFR request selector 346. In other words, the result is $TP \geqq 0$ when controlling the minimum frame rate, and the packet is stored in the packet buffer module 345. Moreover, when "1" is output from the MFR compliance decision unit 3435, "1" is sent to the MFR request selector 346.

Figure 5:
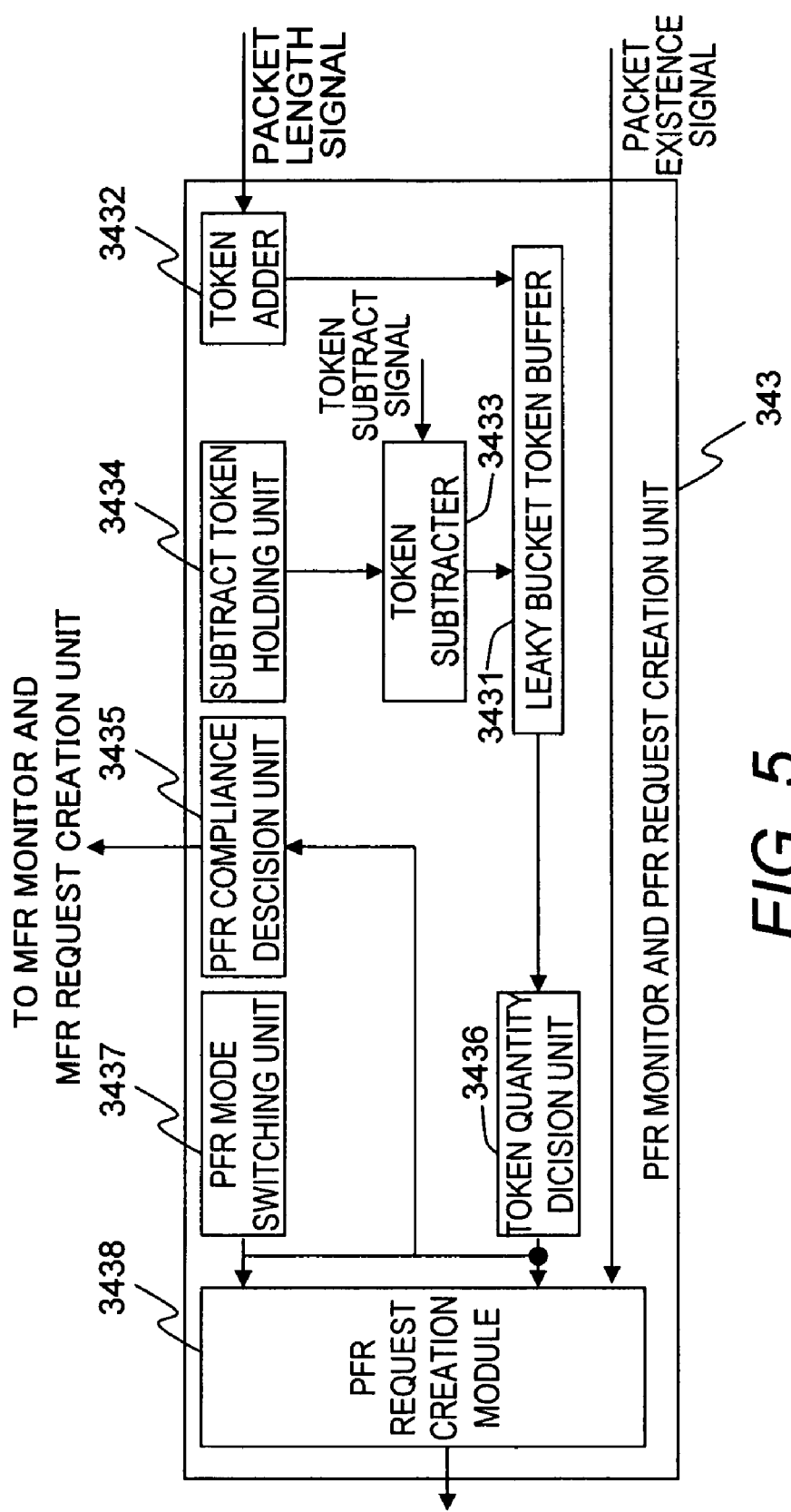
FIG. 5 is a block diagram of the PFR monitor and PFR request creation unit of the first embodiment.

FIG. 5 is a block diagram of the PFR monitor and PFR request creation unit 343 of the first embodiment of this invention.

The PFR monitor and PFR request creation unit 343 controls the peak frame rate. This PFR (peak frame rate) control is a service that guarantees control of the bandwidth by reliably transmitting data between the user and carrier within the bandwidth specified in the contract. The leaky bucket algorithm is ideal for peak frame rate control.

The PFR monitor and PFR request creation unit 343 includes a leaky bucket token buffer 3431, a token adder 3432, a token subtracter 3433, a subtract token holding unit 3434, a PFR compliance decision unit 3435, a token quantity decision unit 3436, a PFR mode switching unit 3437, and a PFR request creation module 3438.

The leaky bucket token buffer 3431 holds parameters (token quantity (TL) accumulated in the leaky bucket) used in the leaky bucket algorithm. The PFR monitor and PFR request creation unit 343 subtracts tokens accumulated in the leaky bucket token buffer 3431 in fixed amounts and a fixed quantity, and adds tokens based on the transmitted packet length.

The token adder 3432 adds tokens in a quantity matching the packet length, to the leaky bucket token buffer 3431 based on the transmitted packet length output from the packet buffer module 345.

The subtract token holding unit 3434 holds the periodically subtracted token subtraction quantity. The controller 330 sets the token subtraction quantity.

The token subtracter 3433 subtracts a fixed quantity of tokens at fixed times. More specifically, the token subtracter 3433 subtracts the token quantity held in the subtract token holding unit 3434 when input with a token subtract signal (i.e. clock signal).

The token quantity decision unit 3436 decides the token quantity (TL) accumulated in the leaky bucket token buffer 3431. If TL=0 then the token quantity decision unit 3436 sets "1,", and if TL≠0 then it sets "0", and outputs that TL value to the PFR compliance decision unit 3435 and the PFR request creation module 3438.

The PFR compliance decision unit 3435 decides from the logic shown in FIG. 8, whether the MRF control is ON or OFF (valid/invalid) based on the token quantity accumulated in the leaky bucket and the PFR mode valid/invalid flag. The PFR compliance decision unit 3435 therefore outputs "1", to set the MFR control to ON; and outputs "1" to set the MFR control to OFF.

The PFR mode switching unit 3437 holds the PFR mode ON or OFF information set by the controller 330. The PFR mode switching unit 3437 outputs to the PFR request creation module 3438 "1" if the PFR mode is ON, and outputs "0" if the PFR mode is OFF.

The PFR request creation module 3438 totals the logic sum of the signal output from the MFR mode switching module 3427, the signal output from the token quantity decision unit 3436, and the packet switching (on/off) signals output from the packet buffer module 345. The result from the logic sum is the packet transmission request and is sent to the PFR request selector 347. In other words, the result is TL=0 when controlling the peak frame rate. Moreover, when the packet is stored in the packet buffer module 345, "1" is sent to the PFR request selector 347.

Figure 6:
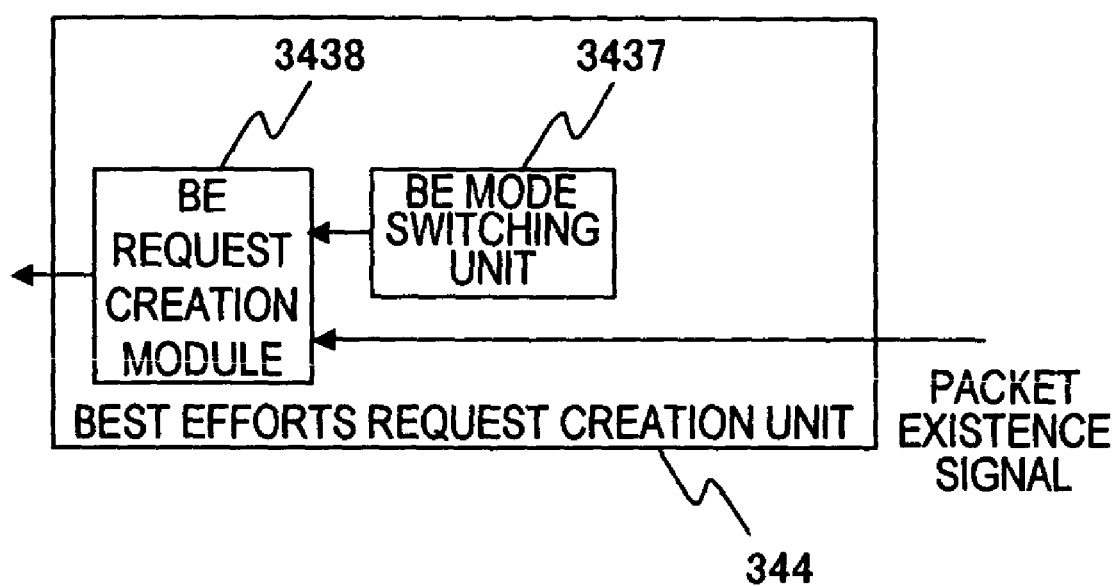
FIG. 6 is a block diagram of the best efforts request creation unit of the first embodiment.

FIG. 6 is a block diagram of the best efforts request creation unit 344 of the first embodiment of this invention.

The best efforts request creation unit 344 includes a BE mode switching unit 3437 and a BE request creation module 3448.

The BE mode switching unit 3437 holds the BE mode ON or OFF information set by the controller 330. The BE mode switching unit 3437 outputs to the BE request creation module 3448, "1" if the BE mode is ON and outputs "0" if the BE mode is OFF.

The BE request creation module 3448 calculates the logic sum of the signal output from the BE mode switching unit 3437 and the packet switching signal output from the packet buffer module 345. The result from the logic summing is a packet transmission request and is sent to the BE request selector 348. In other words, the BE request creation module 3448 sends "1" to the BE request selector 348, during BE mode control, and when there is a packet stored in the packet buffer module 345.

FIG. 7 is a table showing the operation mode control table 400 of the first embodiment of this invention.

The operation mode control table 400 is stored within the controller 330. The operation mode control table sets whether to execute MFR control or PFR control or BE control according to the mode set by the user. The operation mode control tables 400 are installed in the controller 330 and match the number of bandwidth control units 341, and different bandwidth control modes can be set in each queue.

The operation mode control table 400 includes a mode number 401, an MFR control flag 402, a PFR control flag 403 and a BE control flag 404.

The mode control flag 402 is a parameter that sets whether to implement minimum frame rate control. The PFR control flag 403 is a parameter that sets whether to implement peak frame rate control. The BE control flag 404 is a parameter that sets whether to implement best efforts control.

Modes 1 through mode 5 are specified within the operation mode control table 400. The network node of the first embodiment performs different bandwidth control by means of these five types of modes.

In the mode 1, the best efforts control is validated, and the minimum frame rate control and peak frame rate control are invalidated. Consequently, only the best efforts request creation unit 344 functions so that the conventional best efforts service is provided.

In the mode 2, the minimum frame rate control is validated, and the peak frame rate control and best efforts control are invalidated. Consequently, packets can be transmitted while controlling and guaranteeing the minimum frame rate for each user and the contract bandwidth can be reliably guaranteed.

In the mode 3, the minimum frame rate control and the peak frame rate control are validated, and the best efforts control is invalidated. Consequently, the user can transmit packets at the MFR even when the lines are congested. The user can also used the empty bandwidth when lines are available and can transmit packets up to the peak frame rate.

As described later in FIG. 8, with an empty mode occurring in mode 3, and when transmitting packets below the minimum frame rate (when tokens stored in the token bucket token buffer 3421 are always positive), the mode 3 can be subdivided into two types of modes called a minimum bandwidth priority mode and a maximum bandwidth priority mode according to whether or not to transmit a packet exceeding the peak frame rate.

In the mode 4, the minimum frame rate control and the best efforts control are validated, and the peak frame rate control is invalidated. Consequently, the user can transmit packets at the minimum frame rate even when the lines are congested. Moreover, the user can use empty bandwidth to transmit packets at best efforts with no restrictions.

In the mode 5, the peak frame rate control, and turns off the minimum frame rate control and the best efforts control are validated. Consequently, each user can send packets while reliably limiting traffic to within the contract bandwidth.

The first embodiment can therefore also provide control (best efforts control and joint control of empty bandwidth by using best efforts control and contract bandwidth guarantee control) impossible to implement the technology described in patent document 1.

FIG. 8 is a drawing showing the PFR compliance table 410 of the first embodiment of this invention.

The PFR compliance table 410 is stored within the PFR compliance decision unit 3435. The PFR compliance table 410 is used to decide whether to allow packet transmission when the user transmits packet quantity is within the minimum frame rate but has exceeded the peak frame rate. These type of circumstances occur when the user is continuously sending packets within the minimum frame rate but packets are transmitted in bursts at certain times in a region exceeding the peak frame rate (when the token bucket tokens and the leaky bucket tokens are both positive). In other words, the PFR compliance table 410 sets whether to give priority to peak frame rate control or minimum frame rate control in mode 3 described above.

In other words, when data within the minimum frame rate is continually transmitted within the past hour, and tokens have accumulated within the token bucket, then the result allows packet transmission. However when in this same state the user has transmitted packets in bursts, then the tokens cannot be subtracted from the leaky bucket so a state is also reached where tokens accumulate in the leaky bucket, and the result prohibits packet transmission. When a conflict of this type occurs between the token packet and the leaky bucket, the PFR compliance table 410 is used to decide which result is to have priority.

The PFR compliance table 410 includes an MFR priority flag 411, a PFR valid/invalid flag 412, a token quantity decision flag 413 and a decision result flag 414. The PFR compliance table 410 takes the information 411 through 413 into account, and outputs "1" when the result is allows packet transmission via PFR control, and outputs "0" when the result is prohibiting packet transmission.

In mode 3 (minimum allowable bandwidth and peak frame rate control service), the MFR priority flag 411 decides whether to give control priority to the minimum frame rate or to the peak frame rate. In other words, when the MFR priority flag 411 is "1", the minimum bandwidth priority mode gives the minimum frame rate priority so that the output from PFR compliance decision unit 3435 is "1" and minimum frame rate control is ON.

The PFR valid/invalid flag 412 is information on the valid/invalid state of the PFR mode and is held in the PFR mode switching unit 3437.

The token quantity decision flag 413 is the result for the token quantity accumulated in the leaky bucket token buffer 3431 of token quantity decision unit 3436.

The decision result flag 414 decides the result output to the MFR monitor and MFR request creation unit 342.

In mode 3, when the MFR priority flag 411 is "0", the peak frame rate mode is set and gives priority to the peak frame rate control. The minimum frame rate control is set to valid/invalid according to the token quantity stored in the leaky bucket.

Figure 9:
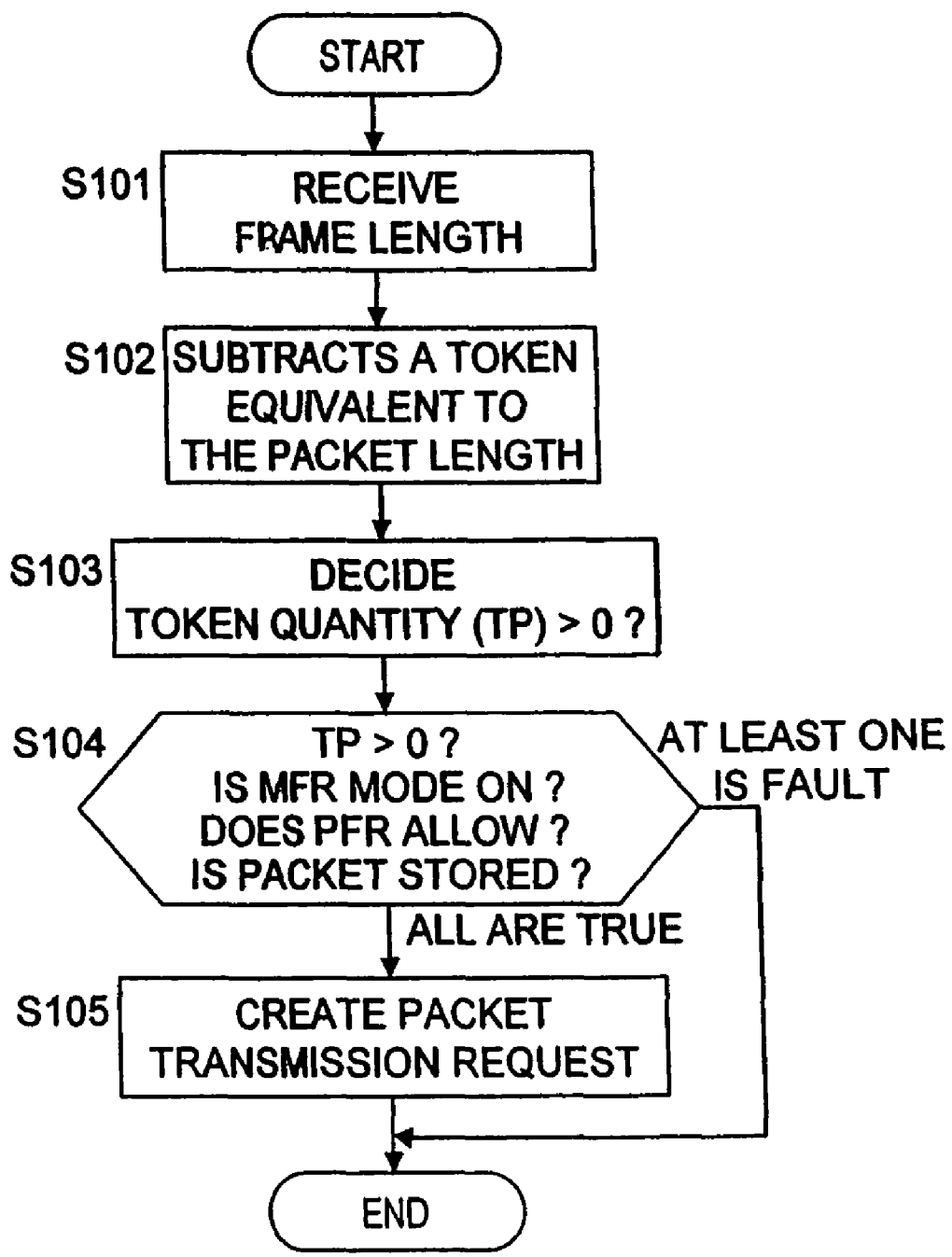
FIG. 9 is a flow chart of the token subtraction processing of the first embodiment.

FIG. 9 is a flowchart showing the process of subtracting tokens implemented by the MFR monitor and MFR request creation unit 342 of the first embodiment of this invention.

First of all, when a transmit packet length signal is received from the packet buffer module 345 (S101), the token subtracter 3422 subtracts a token equivalent to the packet length that is sent, from the token bucket token buffer 3421 (S102).

Next, the token quantity decision unit 3426 decides whether or not the token quantity (TP) accumulated in the token bucket token buffer 3421 is negative or positive (S103), and outputs the decision result to the MRF request creation module 3428.

The MRF request creation module 3428 next calculates the logic sum of the signals that were input (S104). In other words, when TP>0, the MFR mode is ON, the state allows PFR, and moreover when packets are accumulated in the packet buffer module 345, then the packet transmission timing is judged as within the minimum frame rate, and a packet transmission request is made and sent to the MFR request selector 346 (S105).

On the other hand, when any of the conditions among a state where TP>0, PFR is allowed, the MFR mode is ON, or packets accumulated in the packet buffer module 345 are not fulfilled, then the transmission timing is not set by minimum frame rate control so packet transmission requests cannot be made, and this process terminates.

Figure 10:
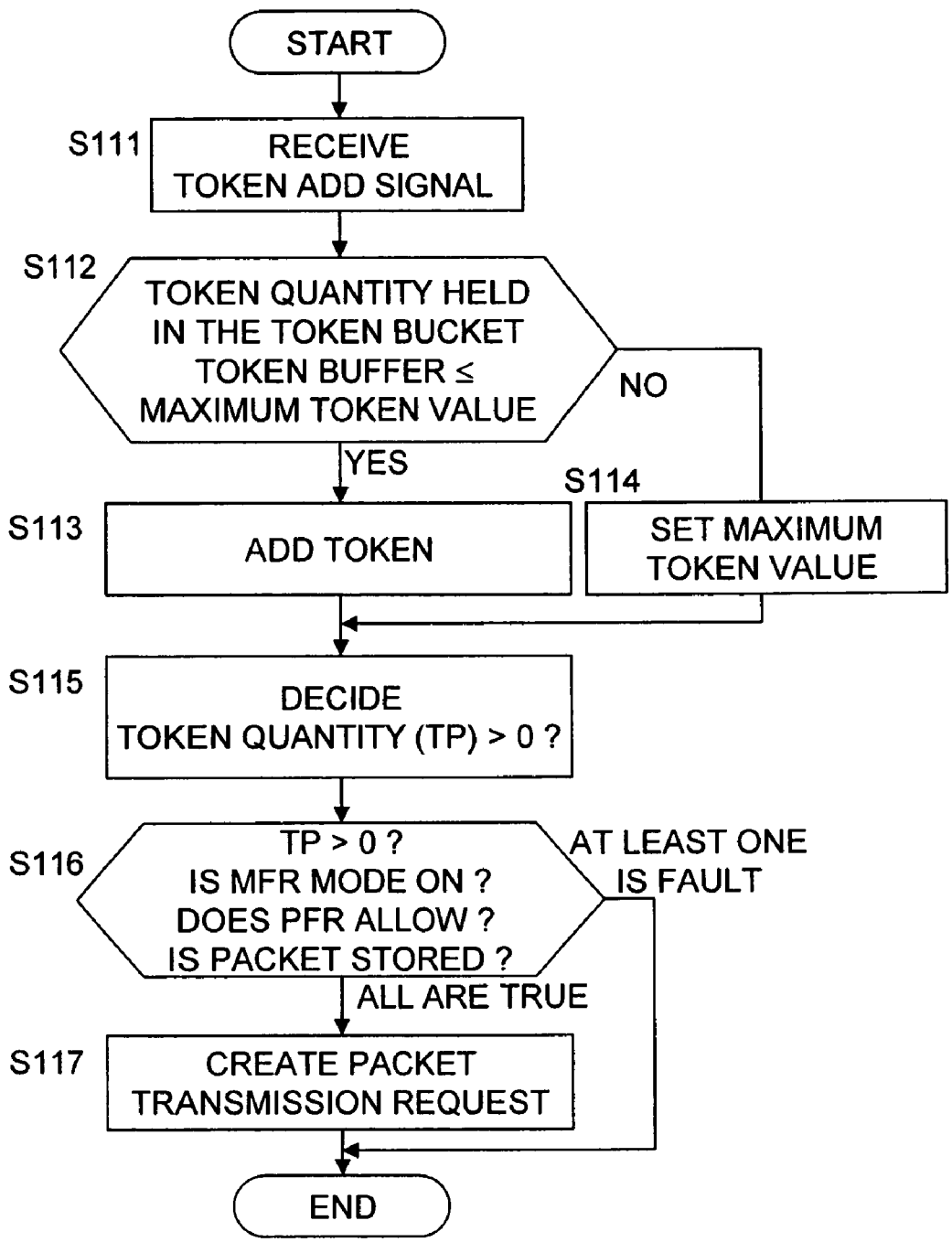
FIG. 10 is a flow chart of the periodic token add processing of the first embodiment.

FIG. 10 is a flowchart of the periodic token add processing executed by the MFR monitor and MFR request creation unit 342 of the first embodiment of this invention.

On receiving a token add signal (S111), the token adder 3423 compares the sizes of token quantity values (TP) accumulated in the token bucket token buffer 3421 adding to the add token holding unit 2424 value, with the value in the maximum token holding unit 3425 (S112).

If the result is that the token quantity after adding to add token holding unit value 3424 is less than the maximum token value then the token adder 3423 adds the token quantity held in the add token holding unit 3424 to the leaky bucket token buffer 3421 (S113).

However, when the new token quantity exceeds the maximum token value after adding the token, then the token adder 3423 sets the value held in the maximum token holding unit 3425 into the token bucket token buffer 3421(S114).

The token quantity decision unit 3426 then decides whether or not the token quantity (TP) accumulated in the token bucket token buffer 3421 is positive or negative (S 115) and outputs it to the MRF request creation module 3428.

The MRF request creation module 3428 next calculates the logic sum of the signals that were input (S116). In other words, when TP>0, the MFR mode is ON, the state allows PFR, and moreover when packets are accumulated in the packet buffer module 345, with packet transmission timing is judged as within the minimum frame rate, and a packet transmission request is made and sent to the MFR request selector 346 (S117).

On the other hand, when any of the conditions in states where TP>0, PFR is allowed, and MFR mode is ON, or packets accumulating in the packet buffer module 345 were not fulfilled, then the packet transmission timing is not set by minimum frame rate control so packet transmission requests cannot be made, and this process terminates.

Figure 11:
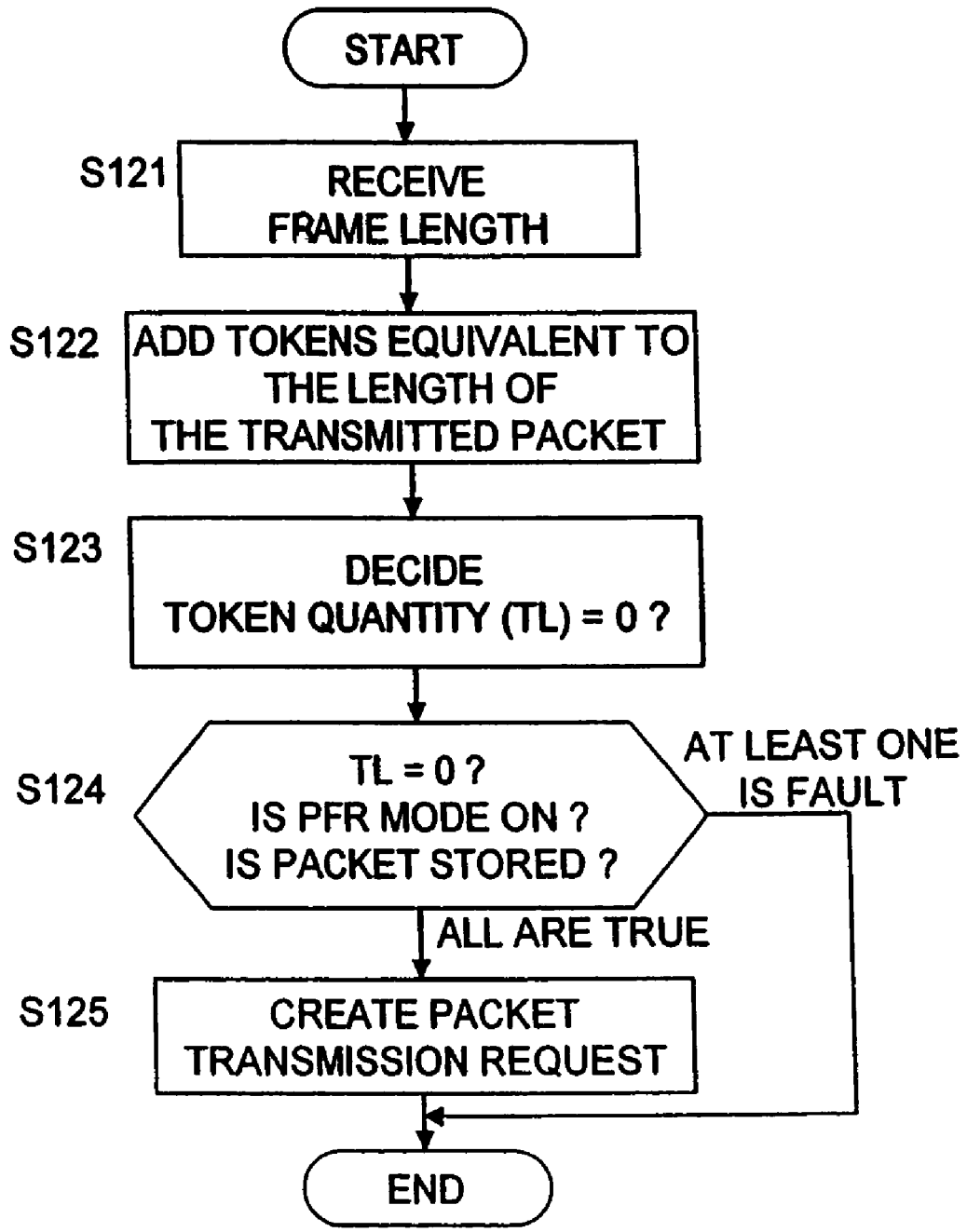
FIG. 11 is a flow chart of the token add processing of the first embodiment.

FIG. 11 is a flow chart showing the token add processing executed by the PFR monitor and PFR request creation unit 343 of the first embodiment of this invention.

On receiving a transmit packet length signal (S121) from the buffer 345, the token adder 3432 adds tokens equivalent to the length of the transmitted packet, to the leaky bucket token buffer 3438 (S122).

The token quantity decision unit 3436 decides whether or not there is a token quantity (TL) accumulated in the leaky bucket token buffer 3431 (S123), and outputs the decision result to the MPRF request creation module 3438.

The MPRF request creation module 3438 next calculates the logic sum of the signals that were input (S 124). In other words, when TP=0, the PFR mode is ON, and moreover when packets are accumulated in the packet buffer module 345, the packet transmission timing is judged as under peak frame rate control, and a packet transmission request is made and sent to the PFR request selector 347 (S125).

On the other hand, when any of the condition in states where TP=0, the PFR mode is ON, or packets accumulating in the packet buffer module 345 were not fulfilled, then the packet transmission timing is not set under peak frame rate control so packet transmission requests cannot be made, and this process terminates.

Figure 12:
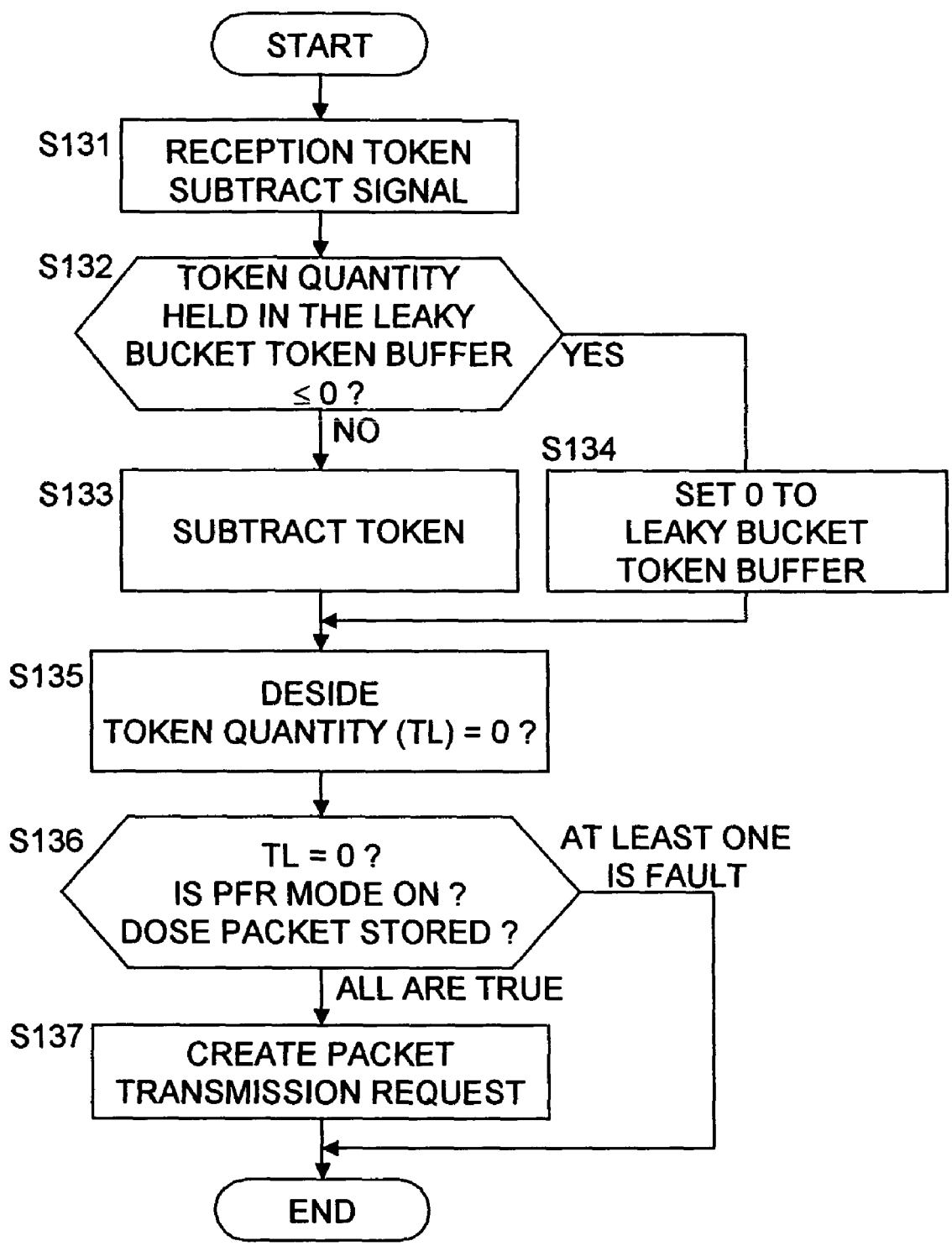
FIG. 12 is a flow chart of the periodic token subtract processing of the first embodiment.

FIG. 12 is a flow chart showing the periodic token subtract processing executed by the PFR monitor and PFR request creation unit 343 of the first embodiment of this invention.

On receiving the token subtract signal (S131), the token subtracter 3433 compares the value after subtracting the value in the subtract token holding unit 3434 from the token quantity accumulated in the leaky bucket token buffer 3431, with "0" (S132).

When the result after subtracting the value in the subtract token holding unit 3434, is that the token quantity is larger than "0" the subtracted tokens held in the subtract token holding unit 3434 are subtracted from the leaky bucket token buffer 3431 (S133).

However, when the token quantity after subtraction is "0" or less, then "0" is set in the leaky bucket token buffer 3431 (S134).

The token quantity decision unit 3436 then decides whether or not the token quantity (TL) has accumulated in the leaky bucket token buffer 3431 (S135), and outputs the decision result to the PFR request creation module 3438.

The PFR request creation module 3438 next calculates the logic sum of the signals that were input (S136). In other words, when TL=0, the PFR mode is ON, and moreover when packets are accumulated in the packet buffer module 345, the packet transmission timing is judged as under peak frame rate control, and a packet transmission request is made and sent to the PFR request selector 347 (S 137).

On the other hand, when any of the conditions in states where TP=0, the PFR mode is ON, or packets accumulated in the packet buffer module 345 were not fulfilled, then the packet transmission timing is not under peak frame rate control so packet transmission requests cannot be made, and this process terminates.

Figure 13:
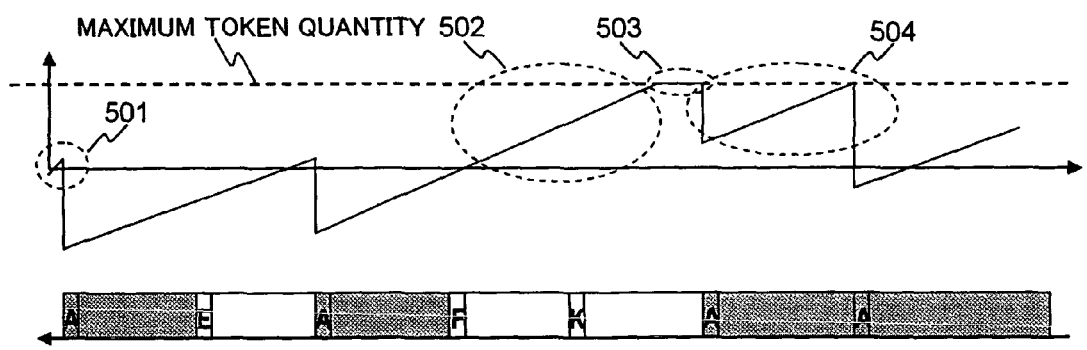
FIG. 13 is a drawing of the token operation of the token bucket of the first embodiment.

FIG. 13 is a drawing showing the token operation in the token bucket during the operation mode "2" (minimum frame rate) of the first embodiment of this invention.

The operation mode 2 is a method for controlling the bandwidth using the formula R×T+B of the token bucket algorithm and is suitable for guaranteeing the minimum bandwidth (refer to FIG. 7)

The token bucket algorithm is used for controlling the packet transmission in minimum frame rate services. This description assumes that there is always a user packet stored in the packet buffer module 345.

In the token bucket algorithm, a fixed quantity of tokens is added to the bucket in fixed cycles. This fixed quantity of additional tokens is equivalent to the minimum frame rate that is set. Packet transmit permission is then issued if the token quantity is positive. When the packet is sent, a token is subtracted that corresponds to that packet length.

More specifically, tokens are added and when the token quantity reaches (TP)>0, the packet transmit permission is issued and the packet is sent. Then, when the packet is sent, a token equivalent to that transmit packet length is subtracted from the bucket (501).

Even afterwards, tokens are added to the token bucket in fixed Quantities and at a fixed cycle, and the packet sent if the token quantity is positive. However, packet transmission might be impossible in some cases such as when other users are transmitting packets (502).

When results from adding the token to the token bucket reach the maximum token value, control is implemented so that no more tokens are added (503).

Packets are sent afterwards when packet transmission by other users has ended. Moreover, packets can be continually sent if there is empty bandwidth and TP>0.

The token bucket algorithm is therefore used in this way for control to guarantee the minimum bandwidth.

Figure 14:
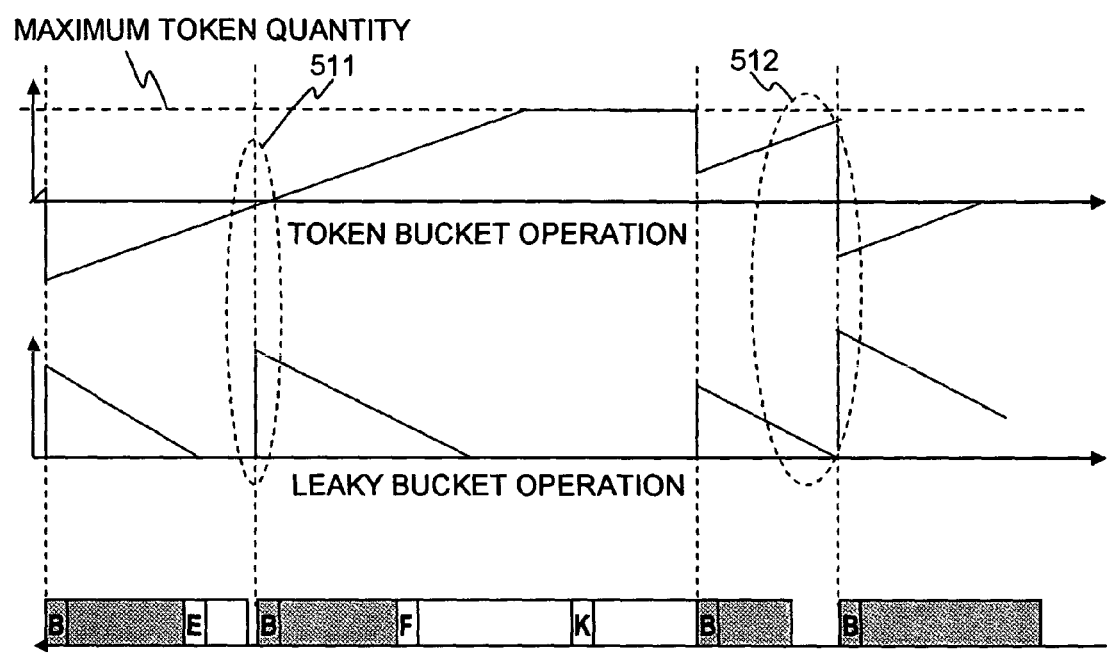
FIG. 14 is a drawing of the token operation of the token bucket and the leaky bucket of the first embodiment.

FIG. 14 is a drawing showing the token bucket and leaky bucket operation in the "maximum bandwidth priority mode" (refer to FIG. 7 and FIG. 8) for operation mode 3 of the first embodiment of this invention.

In operation mode 3, the bandwidth is controlled using both the token bucket and the leaky bucket.

The operation mode "3" is a method for controlling the bandwidth using formula R×T and the leaky bucket algorithm. This operation mode "3" is used for restricting the peak frame rate. Here, R is the token quantity subtracted from the bucket per time unit; and T is the time.

The leaky bucket algorithm is used for controlling the packet transmission in peak frame rate services. This description assumes that there is always a user B packet stored in the packet buffer module 345.

In the leaky bucket algorithm, a fixed quantity of tokens is subtracted from the bucket in fixed cycles. This fixed amount of subtracted tokens is equivalent to the peak frame rate that is set. Packet transmit permission is then issued if the token quantity is "0". When a packet is sent, a token is added that corresponds to that transmit packet length.

The device of this embodiment controls both the minimum frame rate and the peak frame rate since it used a combination of the token bucket algorithm and the leaky bucket algorithm.

In the leaky bucket algorithm, a token equivalent to the packet length sent from the queue is added when a packet is sent. Adding a token makes the leaky bucket token become positive, and packet transmit permission signal is not issued to the queue. Tokens are subtracted from the leaky bucket in fixed quantities and in fixed cycle so that the token (TL) becomes "0" after a while and packet transmit permission is issued. In the token bucket algorithm, on the other hand, tokens are decreased according to the length of the packet sent from the queue. A result of decreasing the tokens, is that a packet transmit permission signal cannot be issued to the queue, when the tokens in the token bucket have become negative. Tokens are added to the token bucket in fixed quantities and a fixed cycle so that the token quantity (TP) becomes positive after a while, and packet transmit permission is issued. In other words, if TP>0, and TL=0, then the packet can be sent.

However, when there is empty bandwidth, then packets can be sent if TL=0, even if TP≦0. During packet transmission using this empty bandwidth, the tokens are not subtracted even when TP≦0 (511). Tokens are not subtracted when sending packets at TP≦0 because packet transmissions are restricted during congestion and guaranteeing the minimum bandwidth might be impossible. However, subtracting in this way keeps guaranteeing the minimum bandwidth, and if there is empty bandwidth then packets can be sent using up to the peak frame rate.

However, in maximum bandwidth priority mode of the mode 3, if TL>0, then packet transmission is prohibited even if TP>0 and there is empty bandwidth (512). Transmission is prohibited even in TP>0 because transmitting a packet when TL>0 exceeds the peak frame rate, and prevents limiting the peak frame rate. Limiting the bandwidth fails because when TL>0 in maximum bandwidth priority mode, the PFR compliance decision unit sends "0".

Figure 15:
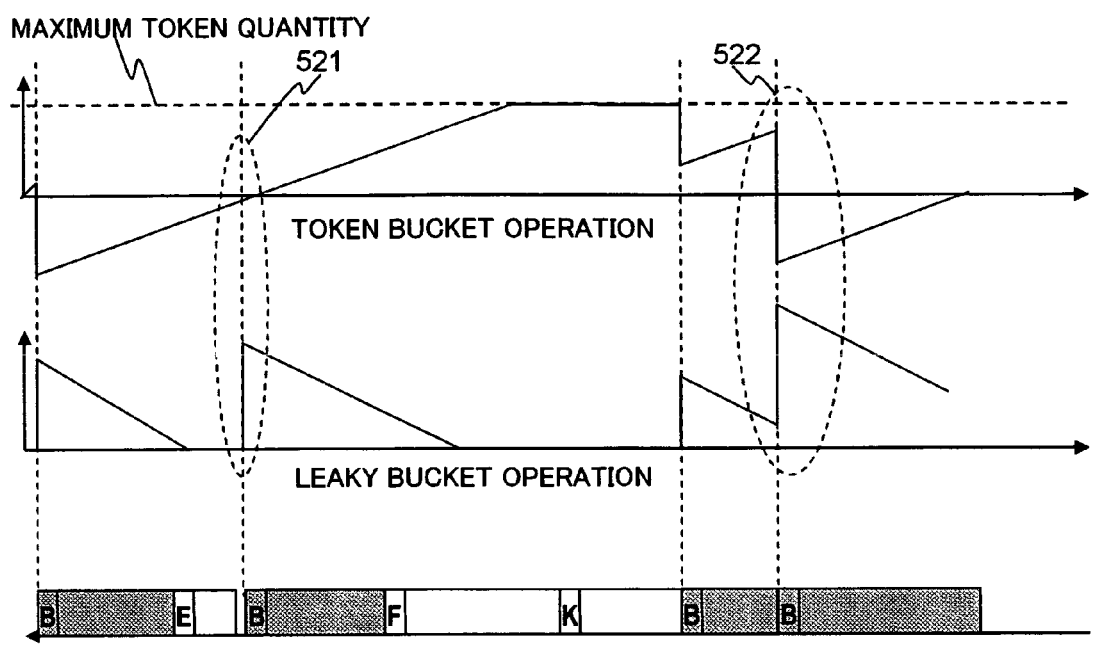
FIG. 15 is a drawing of the token operation of the token bucket and the leaky bucket of the first embodiment.

FIG. 15 is a drawing showing the token bucket and leaky bucket token operation (refer to FIG. 7 and FIG. 8) in minimum bandwidth priority mode of operation mode "3" of the first embodiment of this invention.

This operation to permit transmission of packets using a the minimum frame rate and higher bandwidth when congestion or empty bandwidth occurs is identical to the maximum bandwidth priority mode of operation mode "3" shown in FIG. 14 (521).

On the other hand, the "minimum bandwidth priority mode" operation when the TP>0 and TL>0, is different from the "maximum bandwidth priority mode". In "minimum bandwidth priority mode" packet transmission is allowed if there is empty bandwidth, even when TP>0 and TL>0 (522). By allowing transmission, when the usable bandwidth of the user is for some reason (i.e. the line is occupied by another user) within the minimum frame rate, then packets are transmitted in burst and bandwidth that is unusable up until now can be retrieved, and consequently the minimum frame rate can be reliably guaranteed. That bandwidth can be guaranteed because in "minimum bandwidth priority mode", the PFR compliance decision unit sends "1" regardless of the TL value.

Figure 16:
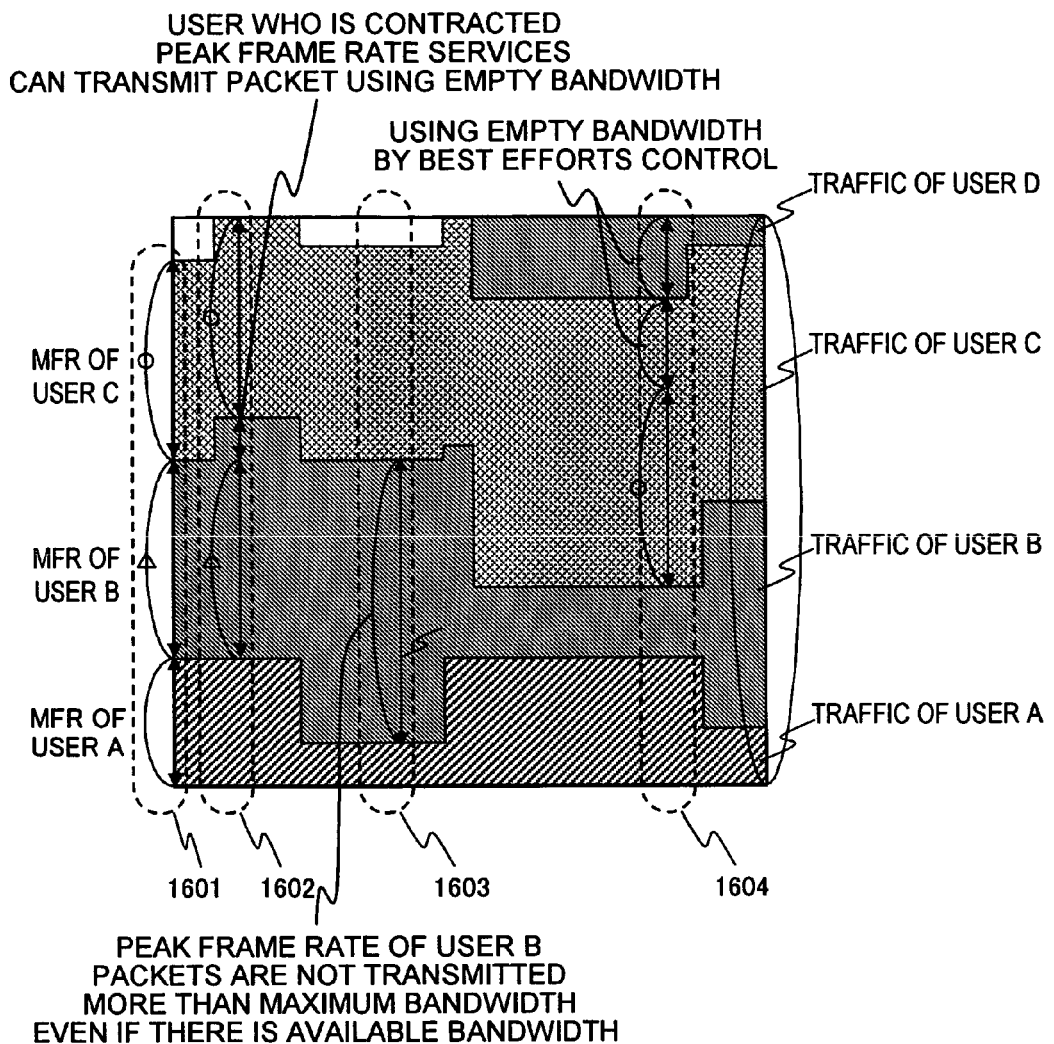
FIG. 16 is a drawing showing the change in user traffic quantity in the first embodiment.

FIG. 16 is a drawing showing the change in user traffic when traffic fluctuations occur in the first embodiment of this invention.

The user A receives the minimum frame rate service (mode 1). The user B receives the minimum frame rate and also the peak frame rate control services (maximum bandwidth priority mode of mode 3). The user C receives the minimum frame rate and the best efforts (mode 4) service. The user D receives the best efforts (mode 1) service.

Different services can in this way be provided to each user in this embodiment by changing the mode settings in each bandwidth control unit 341. Different line bandwidths can also be provided to each user by changing and retaining the subtract token holding unit 3434 settings and the add token holding unit 3424 settings in each bandwidth control unit.

At a certain point time in FIG. 16, the packets arrive in a period in compliance with the minimum frame rate set by the users A, B and C. These packets that arrived are then sent from the network node. The user D does not transmit packets (1601).

Packets from the user B then start to arrive at the network node within the minimum frame rate or higher. The actual quantity of packets arriving from the user B is not clear, however the minimum frame rate between the user A and the user C is ensured, and user B packets can be transmitted using just the empty bandwidth (1602). This type of transmission is possible because the request selector 349 gives selection priority to packet transmission requests sent from the MFR request selector 346.

Packets arriving afterwards from the user A fall within the minimum frame rate and empty bandwidth becomes available. Packets arriving from the user B increase even more. User B packets are at this time transmitted up to the peak frame rate. However, packets are not transmitted at more than the maximum bandwidth even if there is available bandwidth (1603).

Packets are not transmitted above the maximum bandwidth because the MFR monitor and MFR request creation unit 342 will not send packet transmission requests when the value in the token holding bucket is "0" or less (i.e., when the minimum frame rate is exceeded) regardless of whether there are packets or not. The PFR monitor and PFR request creation unit 343 does not send packet transmission requests when the leaky bucket buffer value is larger than "0" (i.e. when the peak frame rate is exceeded) regardless of whether there is a packet or not.

The packets arriving from user B then decrease, and the packets arriving from user A and user C increase. Packets can also arrive from the user D. Since only the minimum frame rate service is provided to the user A, packets cannot be transmitted at other than the bandwidth for which they were set. On the other hand, since the minimum frame rate service and best efforts (mode 4) service are provided to the user C, the empty bandwidth is fairly allotted to the user D and the user C that are provided with the best efforts service, and packets can be transmitted (1604).

Packets can be transmitted because in the minimum frame rate service and best efforts service, when using empty bandwidth and transmitting packets at more than the minimum frame rate, the value of token bucket token buffer 3421 of the MFR monitor and request creation unit of bandwidth control unit 341 is "0" or less and the MFR monitor and request creation unit sends no packet transmission request, and only the best efforts request creation unit 344 sends a packet transmission request.

In the first embodiment as described above, the control units (queues) for the bandwidth include both token buckets for controlling the minimum frame rate and leaky buckets for controlling the peak frame rate. Moreover, these include a best efforts scheduler to allow sending packets only when an empty bandwidth occurs. Best efforts services, contract bandwidth services, peak frame rate control services and combinations of these services can therefore be provided to each user.

Second Embodiment

Figure 17:
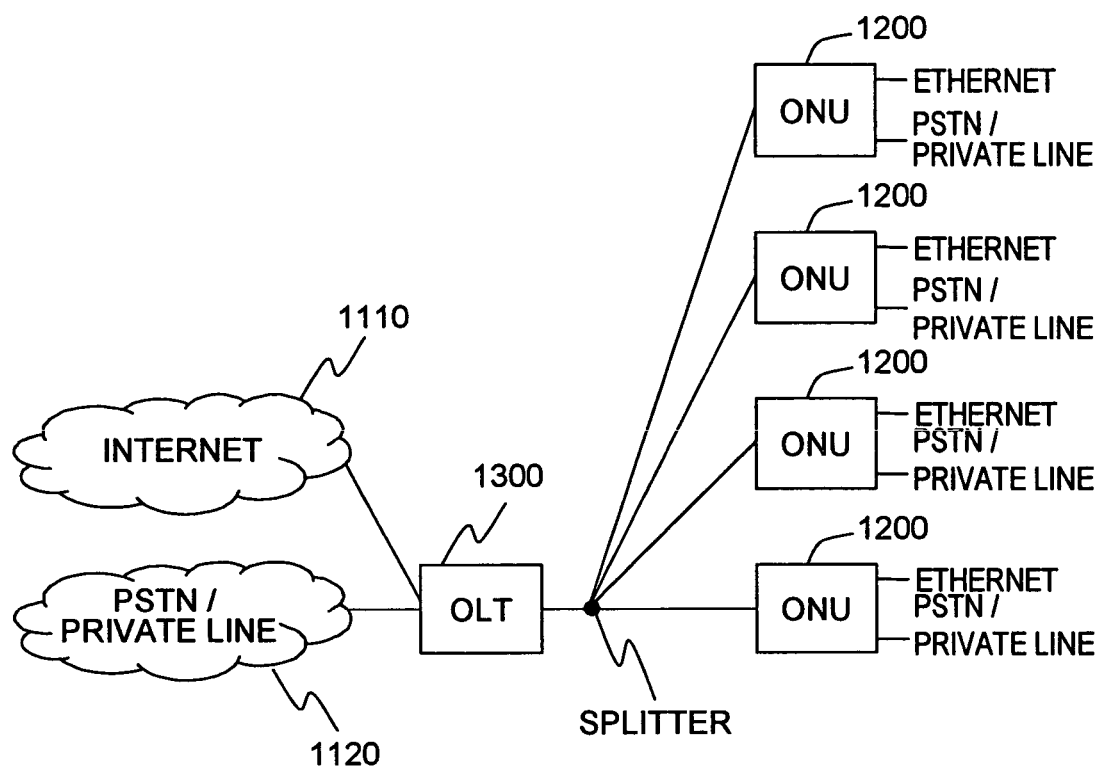
FIG. 17 is a block diagram of the network structure of the second embodiment.

FIG. 17 is a block diagram showing the network structure of the second embodiment of this invention of this invention.

The network of this embodiment of this invention, includes an Internet 1110, a telephone network (private line network) 1120, Optical Network Unit (ONU) 1200 and Optical Line Terminal (OLT) 1300.

The ONU 1200 is a terminating set for the subscriber side of the optical fiber network. The Ethernet and telephone lines (or private lines) installed on the subscriber side connect to the ONU 1200.

The ONU 1200 receives optical signals transmitted from the OLT 1300, and generates electrical signals by optical-electrical conversion. The ONU 1200 also multiplexes signals input from the Ethernet and telephone lines, and transmits them as optical signals at a timing specified from the OLT 1300.

The OLT 1300 is a terminating set on the station side of the optical fiber network. The OLT 1300 connects to the Internet 1110 and the telephone network 1120.

The Internet 1110 is a network (packet switched network) that does not need possession of the line until the data transmission terminates, and provides variable bandwidth communication. The telephone network 1120 is a line switched network (i.e. ISDN network) and needs to possession of the line until data transmission completes (i.e. a line switched network such as the ISDN network), and provides a fixed communications band.

An optical fiber network connects the ONU1200 and the OLT1300. A splitter is installed on the path between the ONU1200 and the OLT1300. The splitter is a signal branching device installed on the optical network. A star coupler may be used as the splitter.

The splitter multiplexes the signals from the multiple ONU1200, and sends them to the OLT1300 along the PON (Passive Optical Network) area serving as the network domain.

Figure 20:
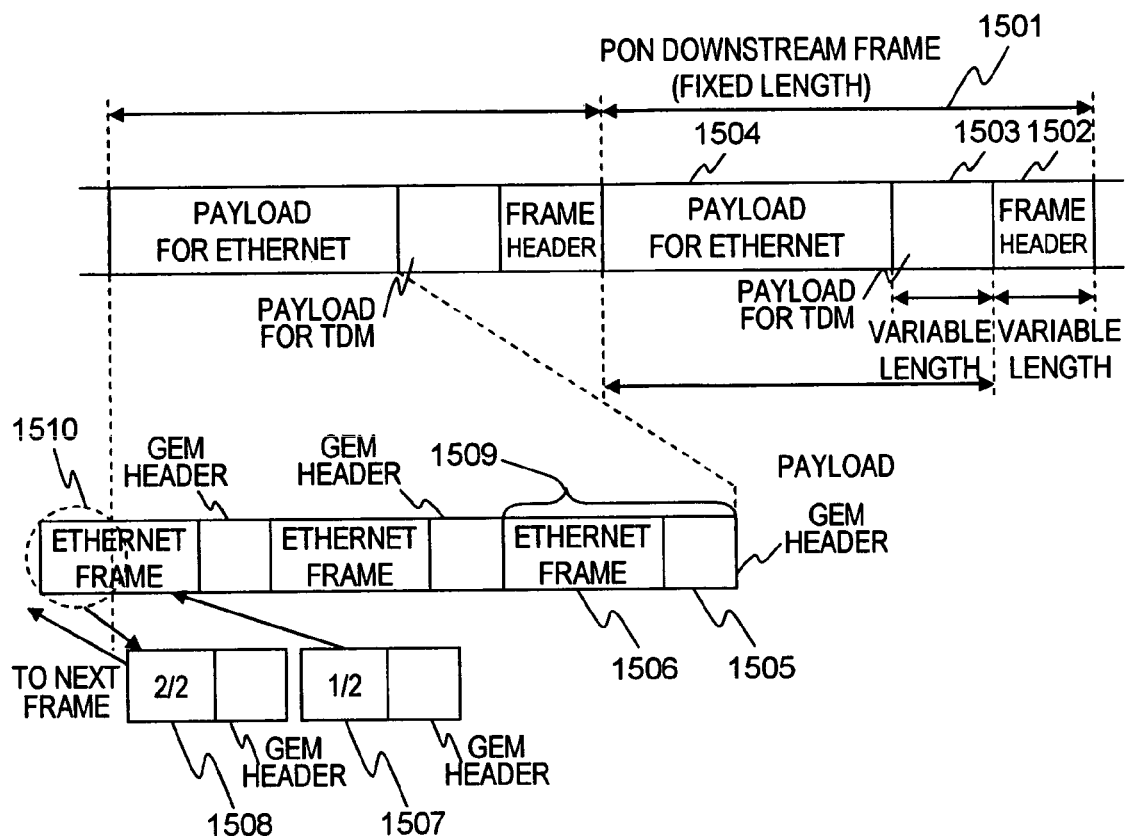
FIG. 20 is a drawing of the structure of the PON frame of the second embodiment.

FIG. 20 is a drawing showing the structure of the PON frame for transmitting data on the PON section of the second embodiment of this invention.

The downstream frame 1501 of the PON section possesses a fixed length and its structure is subdivided into a frame header 1502 and a payload. The TDM data is generally stored into the payload first and the Ethernet data is stored later so that the payload is here separated into a TDM payload 1503 and an Ethernet payload 1504. Moreover, packets other than the Ethernet packet are sometimes stored in the Ethernet payload 1504, however here Ethernet serves as the variable length packet.

A transmission packet buffer selector 1352 stores the TDM payload 1503 and the Ethernet payload 1504 inside the PON frame 1501.

The frame header 1502 is variable length data including ONU1200 control information (such as the PON section upstream bandwidth, structural information on the ONU1200, etc.). Areas other than the frame header 1502 are payloads assigned to data.

The TDM payload 1503 is a variable length area assigned to data of a fixed bandwidth.

The Ethernet payload 1504 is a variable length area assigned to variable bandwidth data. In other words, variable bandwidth data is assigned to areas other than the frame header 1502 and TDM payloads.

The Ethernet payload 1504 includes multiple GEM packets 1509. The Ethernet packet is sent as a capsule to the GEM packet 1509 in the PON section. The GEM packet 1509 includes a GEM header 1505 storing information such as the packet destination and the packet length, and a GEM payload 1506. The GEM payload includes an Ethernet frame.

The PON downstream frame 1501 here is a fixed length. An Ethernet packet 1510 therefore appears that does not fit into the Ethernet payload as shown in FIG. 20. The OLT1300 at this time separate the Ethernet packet in two pieces and stores each into the GEM packet. In other words, the first half 1507 of the divided Ethernet packet is stored within the Ethernet payload storing the current packet, and the latter half 1508 is stored in the beginning of the Ethernet payload.

Figure 18:
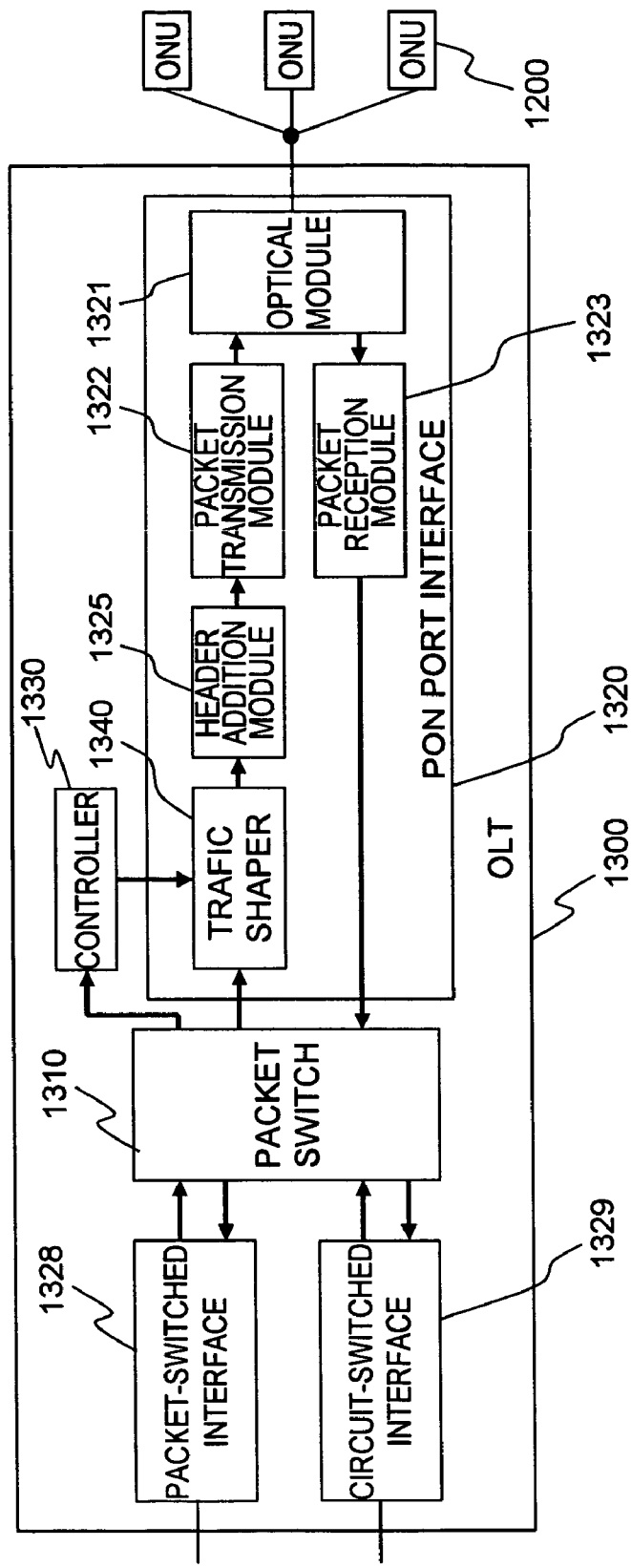
FIG. 18 is a block diagram of OLT of the second embodiment.

FIG. 18 is a block diagram of the OLT1300 of the second embodiment of this invention.

The OLT1300 includes a packet switch 1310, a PON port interface 1320, a controller 1330, a packet switched interface 1328 and a circuit switched interface 1329. The packet switched interface 1328, circuit switched interface 1329, and the PON port interface 1320 are shown as one element each for purposes of simplicity, however these may be multiple elements.

The packet switch 1310 checks the internal header in the data that is sent, sets the interface to send the applicable data to, and sends the data to the interface that it set.

The PON port interface 1320 terminates the PON section optical fiber network, and by optical-electric conversion generates an electrical signal from the received optical signal. The PON port interface 1320 then analyzes the header in the received frame, attaches an internal header and sends received frame to the packet switch 1310.

A controller 1330 sets each of the operating modes on and off and sets the thresholds used in the traffic shaper 1340. The controller 1330 then sends these settings to the traffic shaper 1340.

The packet switched interface 1328 is an interface for connecting the OLT1300 to the Internet 1110. The packet switched interface 1328 transmits packets to the Internet 1110, and receives packets from the Internet 1110.

The circuit switched interface 1329 is an interface for connecting the OLT1300 to the telephone network 1120. The circuit switched interface 1329 transmits data to the telephone network 1120 and receives data from the telephone network 1120.

The PON port interface 1320 includes an optical module 1321, a packet transmission module 1322, a packet receiving module 1323, a header addition module 1325, and a traffic shaper 1340.

The optical module 1321 is a optical-electrical converter and is the termination of the optical fiber network in the PON section. The optical module 1321 receives the optical signal sent from the ONU 1200, and generates an electrical signal by optical-electrical conversion. The optical module 1321 transmits an optical signal to the ONU1200 at the specified timing.

The packet transmission module 1322 transmits packets at a timing established by the traffic shaper 1340.

The packet receiving module 1323 extracts the packet from the optical signal received by the optical module 1321 and sends extracted packet to the packet switch 1310.

When a packet is received from the traffic shaper 1340, the header addition module 1325 generates a PON downstream frame 1501 used in transfer in the PON section. The header addition module 1325 generates a header for the PON downstream frame, and transmits the header size of the header that is made, to the traffic shaper 1340 as a frame header length signal. The frame transmission permit signal is sent when preparation to store the packet in the PON downstream frame 1501 payload is complete.

The frame transmission permit signal is continuously sent until the payload is full. Though not shown in the drawing, there is a counter in the header addition module 1325 for counting the received packet length, and this counter stops sending a frame transmission permit signal when the PON downstream frame 1501 payload is full.

The traffic shaper 1340 decides and sets the packet transmission timing.

Figure 19:
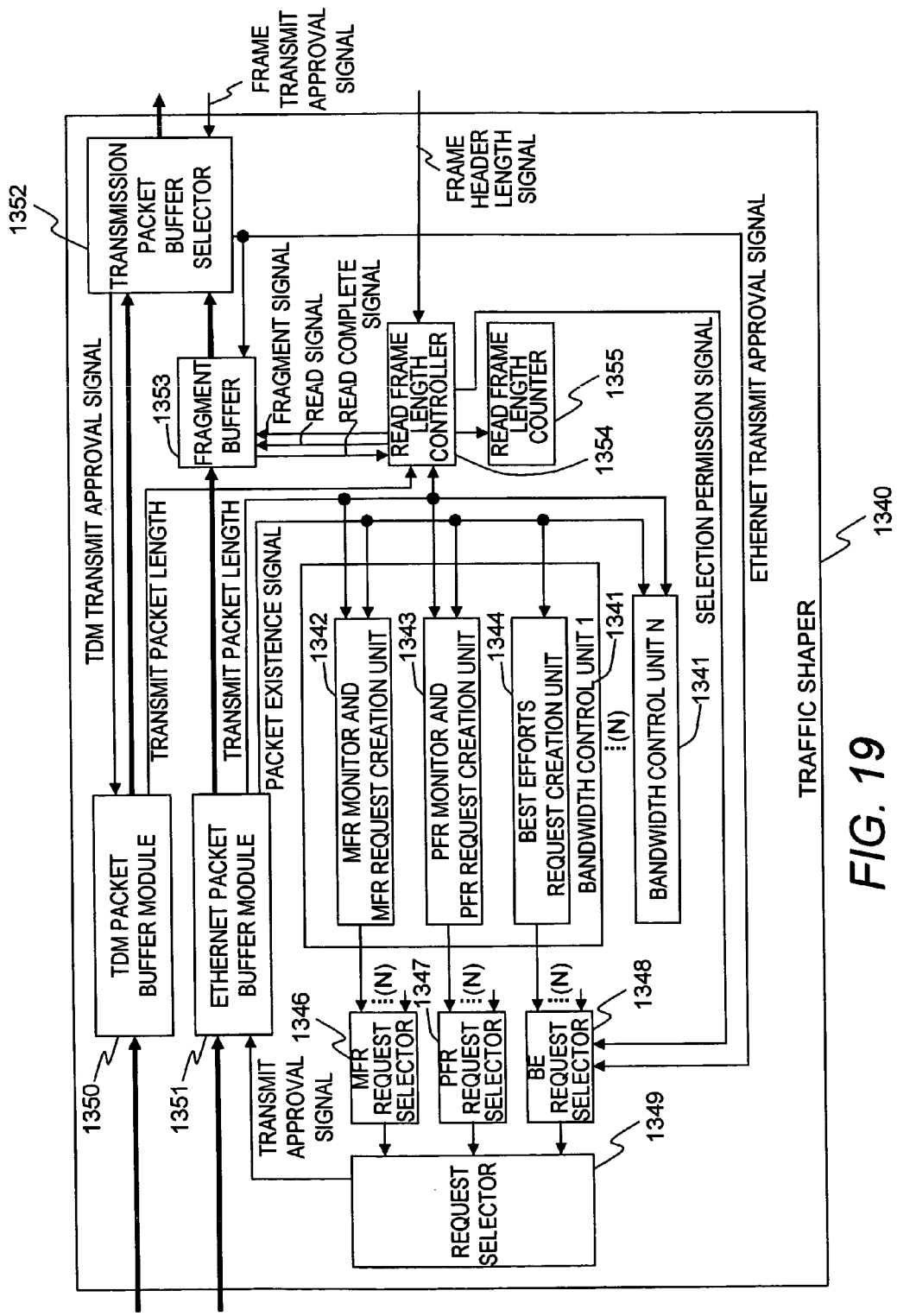
FIG. 19 is a block diagram of the traffic shaper of the second embodiment.

FIG. 19 is a block diagram of the traffic shaper 1340 of the second embodiment of this invention.

The traffic shaper 1340 includes multiple bandwidth control units 1341, an MFR request selector 1346, a PFR request selector 1347, a BE request selector 1348, a request selector 1349, a TDM packet buffer module 1350, an Ethernet packet buffer module 1351, a transmission packet buffer selector 1352, a fragment buffer 1353, a read frame length controller 1354, and a read frame length counter 1355.

The traffic shaper 1340 may be comprised of hardware in view of the processing speed, but may also be comprised of software.

The Ethernet packet buffer module 1351 includes multiple queues for storing data input from the packet switched interface 1328, and sends data stored in the queues by means of the transmit permit signal from the request selector 1349.

The Ethernet packet buffer module 1351 judges the packet length transmitted from the queue, and outputs a transmission packet length signal to the bandwidth control unit 1341 and the read frame length controller 1354. Moreover, the Ethernet packet buffer module 1351 outputs a packet indicator signal to the bandwidth control unit 1351 to show whether or not a packet is stored in the queue. The packet indicator signal is "0" if there is no packet stored in the corresponding queue, and is "1" if there is a packet stored in the queue.

The TDM packet buffer module 1350 includes multiple queues for storing data input from the circuit switched interface 1329. The TDM packet buffer module 1350 outputs data stored in the queue per the transmission permit signal from the request selector 1349.

The TDM packet buffer module 1350 decides the packet length sent from the queue and outputs a transmit packet length signal to the read frame length controller 1354.

The bandwidth control units 1341 are installed for each queue included in the Ethernet packet buffer module 1351, and control the transmission of packets from each queue. The bandwidth control unit 1341 comprises an MFR monitor and MFR request creation unit 1342, a PFR monitor and PFR request creation unit 1343, and a best efforts request creation unit 1344. The bandwidth control unit 1341 controls the packet transmission timing by means of the control algorithm used by each generator.

The MFR monitor and MFR request creation unit 1342 possesses the same structure as the MFR monitor and MFR request creation unit 342 (FIG. 4) of the first embodiment. Also, the PFR monitor and PFR request creation unit 1343 possesses the same structure as the PFR monitor and PFR request creation unit 343 (FIG. 5) of the first embodiment. The best efforts request creation unit 1344 possesses the same structure as the best efforts request creation unit 344 (FIG. 6) of the first embodiment.

The MFR request selector 1346 selects one signal from the MFR monitor and MFR request creation unit 1342 of the multiple bandwidth control units 1341. The signal may for example be selected from the bandwidth control units 1341 in sequence by the round robin method, etc. A packet transmission request for the queue corresponding to the selected bandwidth control units 1341 is then sent to the request selector 1349.

The PFR request selector 1347 selects one signal from the PFR monitor and PFR request creation unit 1343 of the multiple bandwidth control units 1341. The signal may be selected for example from the bandwidth control units 1341 in sequence by the round robin or other method. A packet transmission request for the queue corresponding to the selected bandwidth control units 1341 is then sent to the request selector 1349.

The BE request selector 1348 selects one signal from the MFR monitor and MFR request creation unit 1342 of the multiple bandwidth control units 1341. The signal may for example be selected from the bandwidth control units 1341 in sequence by the round robin method, etc. A packet transmission request for the queue corresponding to the selected bandwidth control units 1341 is then sent to the request selector 1349.

When a packet transmission request is received from the MFR request selector 1346, the PFR request selector 1347, or the BE request selector 1348; the request selector 1349 selects any of the received packet transmission request, and sends a transmission permit signal specifying a queue when the packet may be sent among the multiple queues of the packet buffer module. Preferably, the order of priority among the packet transmission requests in order of high priority is the MFR request selector 1346, the PFR request selector 1347, or the BE request selector 1348. The request selector 1349 is preferably set so as not to select low priority packet transmission requests when there are packet transmission requests with a high order of priority.

The transmission packet buffer selector 1352 sends packet transmit approval to the TDM packet buffer module 1350 and the request selector 1349. When a frame transmit approval signal is received from the header addition module 1325, the transmission packet buffer selector 1352 first of all, transmits a TDM transmit approval signal to the TDM packet buffer module 1350. When the TDM packet buffer module 1350 is empty of accumulated data and the transmit approval signal is being received, the transmission packet buffer selector 1352 sends an Ethernet transmit approval signal to the request selector 1349. The transmission packet buffer selector 1352 continuously transmits the Ethernet transmit approval signal while the frame transmit approval signal is being received, and stops the Ethernet transmit approval signal when the frame transmit signal is no longer received. Also, the transmission packet buffer selector 1352 multiplexes the fixed bandwidth frame data stored in the TDM packet buffer module 1350 and the variable bandwidth data stored in the Ethernet packet buffer module 1351, and sends the packet to the header addition module 1325 according to the frame approval signal. The transmission packet buffer selector 1352 makes a GEM header based on the internal header information of the received packet, and encapsulates the Ethernet packet.

When the frame header length signal is received from the header addition module 1325, the read frame length controller 1354 adds that value to the read frame length counter 1355. During the adding, when the value of the read data length counter is negative, the read frame length controller 1354 transmits a read signal approving the transmitting of packets from the fragment buffer since fragmented Ethernet packets are stored in the fragment buffer 1353.

When the read end signal is received from the fragment buffer 1353, the read frame length controller 1354 transmits the selection approval signal to the request selector 1349.

Also, when the transmit packet length signal is received from the TDM packet buffer module 1350 and the Ethernet packet buffer module 1351; the read frame length controller 1354 subtracts that value from the read frame length counter 1355. When the subtraction results are that the read data length counter value is negative, the read frame length controller 1354 sends a fragment signal to the fragment buffer 1353 for dividing the Ethernet packet into two segments as shown in FIG. 20. The read frame length controller 1354 stops the select approval signal when the read data length counter value is zero or less.

When the fragment signal is received, the fragment buffer 1353 stops the sending of packets for storage in the PON frame, and temporarily holds the packets whose transmission is stopped. In other words, variable bandwidth data that could not be stored in the PON frame, is temporarily stored in the fragment buffer 1353, and then sent to the transmission packet buffer selector 1352 at the next frame timing.

The read frame length counter 1355 shows the data length storable in the pay load of the PON downstream frame. Each time the TDM packet buffer module 1350 or Ethernet packet buffer module 1351 transmits a packet, a value equivalent to that packet length is subtracted. The read frame length counter 1355 may also hold a negative value.

Figure 21:
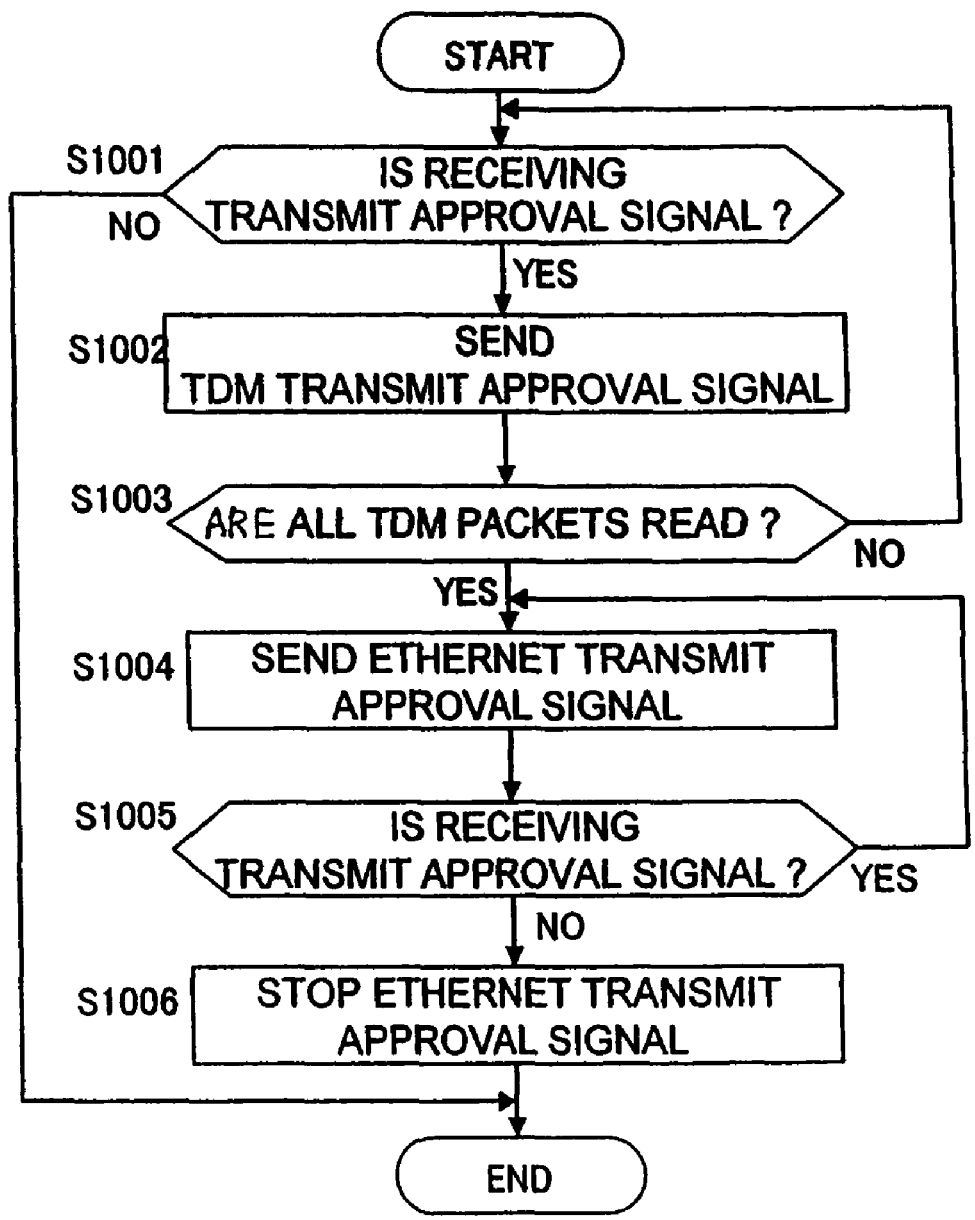
FIG. 21 is a flow chart of the read select processing of the second embodiment.

FIG. 21 is a flow chart of the read processing in the second embodiment of this invention. The transmission packet buffer selector 1352 performs the read select processing.

First of all, the transmission packet buffer selector 1352 decides whether or not a frame transmit approval signal is received (S1001).

If a frame transmit approval signal is received, then a TDM transmit approval signal is sent to the TDM packet buffer module 1350 (S1002), and the TDM packet is read from the TDM packet buffer module 1350 in order to assign fixed wavelength data (TDM packet) prior to assigning variable bandwidth data (Ethernet packet).

Afterwards, a decision is made whether read of all TDM packets is complete (S1003). If read of the TDM packets is not complete, then the process returns to the step S1001, and if a frame transmit approval signal is being received then the TDM packet is read from the TDM packet buffer module 1350.

On the other hand, if read of TDM packets is complete, then the transmission packet buffer selector 1352 sends an Ethernet transmit approval signal to the Ethernet packet buffer module 1351 (S1004), and Ethernet packets are read from the Ethernet packet buffer module 1351.

Afterwards, a decision is made if the frame transmit approval signal is being received or not (S1005). If the frame transmit approval signal is being received, then the process goes to the step S1004, the Ethernet transmit approval signal is sent, and the Ethernet packet is read.

On the other hand, if a frame transmit approval signal is not received, Ethernet packets cannot be assigned to the PON frame, so the Ethernet transmit approval signal is stopped (S1006).

Figure 22:
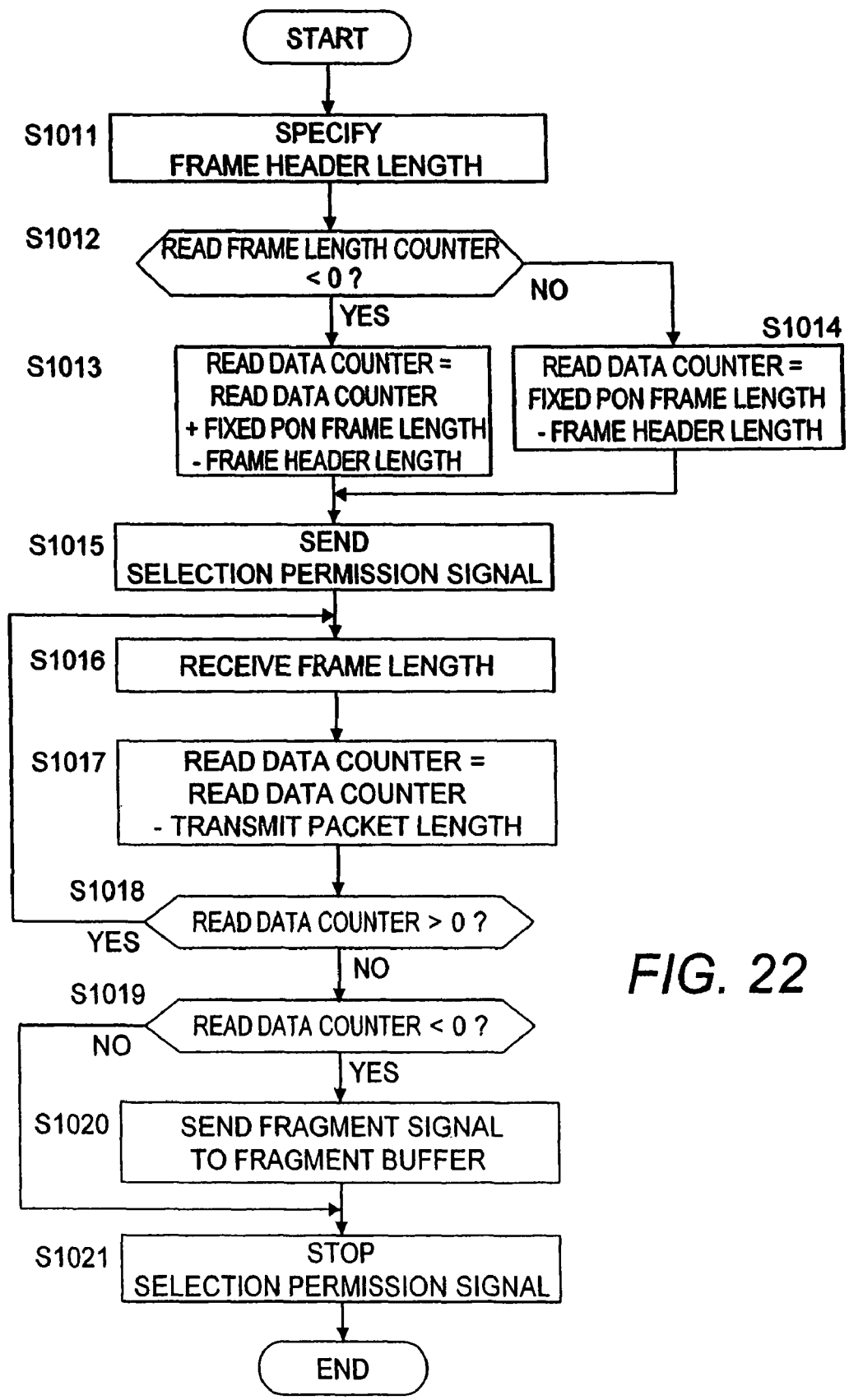
FIG. 22 is a flow chart of the read frame length processing of the second embodiment.

FIG. 22 is a flow chart of the counting process for the read frame length counter values of the read frame length controller of the second embodiment of this invention. The read frame length controller 1354 implements this counting process.

The read frame length controller 1354 specifies the frame header length from the frame header length signal that is received (S1011).

The read frame length controller 1354 next decides whether or not the read frame length counter is a positive or negative value (S1012).

If the read frame length counter value is negative, then the negative (read) data counter value is added to the fixed (PON) downstream frame length, and a value with the PON frame header length subtracted is set in the read frame length counter (S1013).

However, if the read frame length counter value is "0" or more, then a value with the PON frame header length subtracted from the PON frame length is set in the read frame length counter (S1014).

Afterwards, the selection permission signal is sent to the request selector 1349 (S1015). When the packet is read from the Ethernet packet buffer module 1351 or the TEMP packet buffer module 1350 and the transmit packet length signal is then received (S1016).

When the transmit packet length signal is received, the read frame length controller 1354 specified the length of the packet that is sent, and subtracts the specified transmit packet length from the read frame length counter value (S1017).

A decision is afterwards made whether the read frame length counter value is positive or negative (S1018).

If the read frame length counter value is positive, then packets can still be stored in the PON frame so the process returns to the step S1016, and awaits the transmit packet length. However, if the read frame length counter value is "0" or less, then no more packets can be stored in the PON frame so the process goes to step S1019.

In step S1019 a judgment is made if the read frame length counter value is positive or negative. If the read frame length counter value is negative, then packets cannot be stored in the PON frame so a fragment signal is sent to the fragment buffer 1353 (S1020). The select approval signal output is then stopped (S1021) and the process ends.

However, if the read frame length counter value is "0" or more, (in other words, the read frame length counter value is "0") then the packets are stored in the PON frame so this process ends.

Therefore, in the second embodiment as described above, the bandwidth control units (queues) includes a token bucket for minimum frame rate control, a leaky bucket for peak frame rate control, and a schedule for best efforts (control). Moreover, the traffic shaper 1321 includes a TDM packet buffer module 1350, and Ethernet packet buffer module 1351, a fragment buffer 1353, a transmission packet buffer selector 1352, a read frame length controller 1354, and the read frame length counter 1355. Accordingly, this invention can provides best efforts services, contract bandwidth guarantee services, peak frame rate control services and combinations of these services to each user even in indoor station PON systems providing FTTH (Fiber to the Home) access services used widely in recent years.

While the present invention has been described in detail and pictorially in the accompanying drawings, the present invention is not limited to such detail but covers various obvious modifications and equivalent arrangements, which fall within the purview of the appended claims.

What is claimed is:

1. A packet forwarding apparatus for transmitting packets having:
   an interface unit sending and receiving packets,
   a packet switch outputting a received packet to the interface unit as a destination of the received packet, and
   a traffic shaper controlling timing of packet transmission, wherein the traffic shaper comprises:
   a bandwidth control unit controlling a packet transmission bandwidth,
   a packet buffer for temporarily storing the received packet, and
   a request selecting unit determining the received packet to be read out from the packet buffer,
   wherein the bandwidth control unit comprises:
   a first timing generator that makes a first determination judging whether the received packet can be read out from the packet buffer with a bandwidth less than a minimum guaranteed bandwidth or not by using a part of a token bucket algorithm, and
   a second timing generator that makes a second determination judging whether the received packet can be read out from the packet buffer with a bandwidth less than a maximum allowable bandwidth or not by using a part of a leaky bucket algorithm,
   wherein the part of the token bucket algorithm judges that the received packet can be read out from the packet buffer with a bandwidth less than the minimum guaranteed bandwidth when a quantity of tokens held in a token bucket is positive, and the part of the leaky bucket algorithm judges that the packet can be read out from the packet buffer with a bandwidth less than the maximum allowable bandwidth when a quantity of tokens held in a leaky bucket is zero,
   wherein the request selecting unit determines that the received packet can be read out from the packet buffer, when the first timing generator judges based upon the part of token bucket algorithm that the packet can be read out from the packet buffer with a bandwidth less than the minimum guaranteed bandwidth and concurrently the second timing generator also judges based upon the part of the leaky bucket algorithm that the packet can be read out from the packet buffer with a bandwidth exceeding the maximum allowable bandwidth,
   wherein the request selecting unit determines that the received packet can be read out from the packet buffer when, the first timing generator also judges based upon the part of the token bucket algorithm that the received packet can be read out from the packet buffer with a bandwidth exceeding the minimum guaranteed bandwidth and concurrently the second timing generator judges based upon the part of the leaky bucket algorithm that the received packet can be read out from the packet buffer with a bandwidth less than the maximum allowable bandwidth, wherein the request selecting unit, in response to determining that the received packet can be read out from the packet buffer based upon the first determination made by the first timing generator and the second determination made by the second timing generator, sends a transmit approval signal to the packet switch that includes an indication of the received packet, wherein the packet switch, in response to receiving the transmit approval signal, reads the received packet from the packet buffer according to the indication included within the transmit approval signal, and wherein the interface sends the received packet upon the received packet being read from the packet buffer.

2. The packet forwarding apparatus according to claim 1, wherein the interface unit comprising an optical-electrical converter for converting the received optical signal into an electrical signal.

3. The packet forwarding apparatus according to claim 1, wherein the request selecting unit determines the packet to be read out from the packet buffer based on signals outputted from the first timing generator and the second timing generator.

4. The packet forwarding apparatus according to claim 1, wherein the quantity of tokens held in the token bucket can be held negative value.

5. The packet forwarding apparatus according to claim 1, wherein the request selecting unit determines that the received packet will not be read out from the packet buffer when the first timing generator also judges based upon the part of the token bucket algorithm that the received packet can be read out from the packet buffer with a bandwidth exceeding the minimum guaranteed bandwidth and the second timing generator also judges based upon the part of the leaky bucket algorithm that the received packet can be read out from the packet buffer with a bandwidth exceeding the maximum allowable bandwidth.

6. The packet forwarding apparatus according to claim 1, wherein the request selecting unit determines that the received packet will be read out from the packet buffer when the first timing generator judges based upon the part of the token bucket algorithm that the received packet can be read out from the packet buffer with a bandwidth less than the minimum guaranteed bandwidth and the second timing generator judges based upon the part of the leaky bucket algorithm that the received packet can be read out from the packet buffer with a bandwidth less than the maximum allowable bandwidth.

7. The packet forwarding apparatus according to claim 1, the bandwidth control unit further comprises a third time generator for outputting the timing of packet transmission for transmitting the received packet by best efforts control.

8. The packet forwarding apparatus according to claim 1, wherein, in the first timing generator, a maximum value is set for the quantity of tokens held in the token bucket.

9. The packet forwarding apparatus according to claim 1, wherein a first packet controlled according to the minimum guaranteed bandwidth and a second packet controlled according to the maximum allowable bandwidth the packet buffer, and wherein the request selecting unit is configured to, upon determining that the first packet will be read out from the packet buffer based upon a third determination made by the first timing generator and that the second packet will be read out from the packet buffer based upon a fourth determination made by the second timing generator, sends a first transmit approval signal to the packet switch that includes an indication that the first packet is to be output prior to sending a second transmit approval signal to the packet switch that includes an indication that the second packet is to be output.

10. The packet forwarding apparatus according to claim 1, wherein the request selecting unit is configured to generate a signal directing the bandwidth control unit to disable control based on the minimum guaranteed bandwidth.

11. The packet forwarding apparatus according to claim 10, wherein the traffic shaper is configured to determine whether control based on the minimum guaranteed bandwidth is to be enabled or disabled.

12. The packet forwarding apparatus according to claim 1, wherein, upon the first timing generator judging that the received packet can be read out from the packet buffer and the second timing generator judging that the received packet cannot be read out from the packet buffer, the request selecting unit sends the transmit approval signal to the packet switch that includes the indication that the received packet is to be output if a minimum bandwidth priority mode is set, and the request selecting unit does not send the transmit approval signal to the packet switch if the minimum bandwidth priority mode is not set.

13. A network system having an Optical Line Terminal placed in a station side and an Optical Network Unit placed in a subscriber side, wherein the Optical Line Terminal is connected to a core network;
the Optical Line Terminal comprises
an interface unit sending and receiving fixed length frame including variable length packet,
a packet switch outputting a received variable length packet to the interface unit as a destination of the received variable length packet, and
a traffic shaper controlling timing of transmitting the received variable length packet,
wherein the traffic shaper comprises a bandwidth control unit controlling transmission bandwidth of the received variable length packet; a packet buffer temporarily storing the received variable length packet, and a request selecting unit determining the received variable length packet to be read out from the packet buffer,
wherein the bandwidth control unit comprises:
a first timing generator that makes a first determination judging whether the received variable length packet can be read out from the packet buffer with a bandwidth less than a minimum guaranteed bandwidth or not by using a part of token bucket algorithm, and
a second timing generator that makes a second determination judging whether the received variable length packet can be read out from the packet buffer with a bandwidth less than a maximum allowable bandwidth or not by using a part of a leaky bucket algorithm,
wherein the part of the token bucket algorithm judges that the received variable length packet can be read out from the packet buffer with a bandwidth less than the minimum guaranteed bandwidth when a quantity of tokens held in a token bucket is positive, and the part of the leaky bucket algorithm judges that the received variable length packet can be read out from the packet buffer with a bandwidth less than the maximum allowable bandwidth when a quantity of tokens held in a leaky bucket is zero,
wherein the request selecting unit determines that the received variable length packet can be read out from the packet buffer when the first timing generator judges based upon the part of the token bucket algorithm that the received variable length packet can be read out from the packet buffer with a bandwidth less than the minimum guaranteed bandwidth and concurrently the second timing generator also judges based upon the part of the leaky bucket algorithm that the received variable length packet can be read out from the packet buffer with a bandwidth exceeding than the maximum allowable bandwidth,
wherein the request selecting unit determines that the received variable length packet can be read out from the packet buffer when although the first timing generator also judges based upon the part of the token bucket algorithm that the received variable length packet can be read out from the packet buffer with a bandwidth exceeding the minimum guaranteed bandwidth and concurrently the second timing generator judges based upon the part of the leaky bucket algorithm that the received variable length packet can be read out from the packet buffer with a bandwidth less than the maximum allowable bandwidth,
wherein the request selecting unit, in response to determining that the received variable length packet can be read out from the packet buffer based upon the first determination made by the first timing generator and the second determination made by the second timing generator, sends a transmit approval signal to the packet switch that includes an indication that the received variable length packet is to be output,
wherein the packet switch, in response to receiving the transmit approval signal, reads the received variable length packet from the packet buffer according to the indication included within the transmit approval signal, and
wherein the interface sends the received variable length packet upon the received variable length packet being read from the packet buffer.

14. The network system according to claim 13, wherein the interface unit comprises an optical-electrical converter for converting the received optical signal to an electrical signal.

15. The network system according to claim 13,
wherein the quantity of tokens held in the token bucket can be held negative value.

16. The network system according to claim 13,
wherein the request selecting unit determines the received variable length packet to be read out from the packet buffer based on signals outputted from the first timing generator and the second timing generator.

17. The network system according to claim 13,
wherein the request selecting unit determines that the received variable length packet will not be read out from the packet buffer when the first timing generator also judges based upon the part of the token bucket algorithm that the received variable length packet can be read out from the packet buffer with a bandwidth exceeding the minimum guaranteed bandwidth and the second timing generator also judges based upon the part of the leaky bucket algorithm that the received variable length packet can be read out from the packet buffer with a bandwidth exceeding the maximum allowable bandwidth.

18. The network system according to claim 13,
wherein the request selecting unit determines that the received variable length packet will be read out from the packet buffer when the first timing generator judges based upon the part of the token bucket algorithm that the received variable length packet can be read out from the packet buffer with a bandwidth less than the minimum guaranteed bandwidth and the second timing generator judges based upon the part of the leaky bucket algorithm that the received variable length packet can be read out from the packet buffer with a bandwidth less than the maximum allowable bandwidth.

19. The network system according to claim 13,
the bandwidth control unit further comprises
a third timing generator for outputting the timing of packet transmission for transmitting the received variable length packet by best efforts control.

20. The network system according to claim 13,
wherein, in the first timing generator, a maximum value is set for the quantity of the tokens held in the token bucket.

21. A packet forwarding apparatus for transmitting packets having:
an interface unit sending and receiving packets,
a packet switch outputting a received packet to the interface unit as the destination of the received packet,
a traffic shaper controlling timing of a packet transmission and
a control unit controlling the traffic shaper
wherein the traffic shaper comprises:
a bandwidth control unit controlling a packet transmission bandwidth,
a packet buffer temporarily storing the received packet, and
a request selecting unit determining the received packet to be read out from the packet buffer,
wherein the bandwidth control unit comprises:
a first timing generator that makes a first determination judging whether the received packet can be read out from the packet buffer with a bandwidth less than a minimum guaranteed bandwidth or not by using a part of a token bucket algorithm and
a second timing generator that makes a second determination judging whether the received packet can be read out from the packet buffer with a bandwidth less than a maximum allowable bandwidth or not by using a part of a leaky bucket algorithm,
wherein the part of the token bucket algorithm judges that the received packet can be read out from the packet buffer with a bandwidth less than the minimum guaranteed bandwidth when a quantity of tokens held in a token bucket is positive, and the part of the leaky bucket algorithm judges that the received packet can be read out from the packet buffer with bandwidth less than the maximum allowable bandwidth when a quantity of tokens held in a leaky bucket is zero,
wherein the control unit changes between a maximum bandwidth priority mode in which the request selecting unit determines that the received packet can not be read out from the packet buffer and a minimum bandwidth priority mode in which the request selecting unit determines that the received packet can be read out from the packet buffer when the first timing generator judges that the packet can be read out from the packet buffer with a bandwidth less than the minimum guaranteed bandwidth and the second timing generator also judges based upon the part of the leaky bucket algorithm that the received packet can be read out from the packet buffer with a bandwidth exceeding the maximum allowable bandwidth,
wherein the request selecting unit determines that the received packet can be read out from the packet buffer, when the first timing generator also judges based upon part of the token bucket algorithm that the received packet can be read out from the packet buffer with a bandwidth exceeding the minimum guaranteed bandwidth and concurrently the second timing generator judges based upon the part of the leaky bucket algorithm that the received packet can be read out from the packet buffer with a bandwidth less than the maximum allowable bandwidth, wherein the request selecting unit, in response determining that the received packet can be read out from the packet buffer based upon the first determination made by the first timing generator and the second determination made by the second timing generator, sends a transmit approval signal to the packet switch that includes an indication that the received packet is to be output, wherein the packet switch, in response to receiving the transmit approval signal, reads the received packet from the packet buffer according to the indication included within the transmit approval signal, and wherein the interface sends the received packet upon the received packet being read from the packet buffer.

22. The packet forwarding apparatus according to claim 21 the bandwidth control unit further comprises a third timing generator for outputting the timing of packet transmission for transmitting the received packet by best efforts control, wherein the control unit sets whether the timing generation by each timing generator is valid or invalid.

23. The packet forwarding apparatus according to claim 21, wherein the control unit switches whether each of the timing generations by the first timing generator and the second timing generator is valid or invalid.

24. The packet forwarding apparatus according to claim 21, wherein the bandwidth control unit further comprises:

a third timing generator for outputting the timing of packet transmission for transmitting the received packet by best efforts control, and a validity holding unit for holding valid or invalid states of timing generation by each of the timing generators set by the control unit.

25. A network system having an Optical Line Terminal placed in a station side and an Optical Network Unit placed in a subscriber side connected each other with an optical fiber network, wherein the Optical Line Terminal is connected to a core network; the Optical Line Terminal comprises:

an interface unit transmitting and receiving a fixed length frame including a variable length packet, a packet switch outputting a received variable length packet to the interface unit as the destination of the received variable length packet, and a traffic shaper controlling timing of the packet transmission of the received variable length packet wherein:

the traffic shaper comprises:

a bandwidth control unit controlling transmission bandwidth of the received variable length packet, a packet buffer temporarily storing the received variable length packet, and a request selecting unit for determining the received variable length packet to be read from out the packet buffer, wherein the bandwidth control unit comprises:

a first timing generator that makes a first determination judging whether the received variable length packet can be read out from the packet buffer with a bandwidth less than a minimum guaranteed bandwidth or not by using a part of a token bucket algorithm, and a second timing generator that makes a second determination judging whether the received variable length packet can be read out from the packet buffer with a bandwidth less than a maximum allowable bandwidth or not by using a part of a leaky bucket algorithm, wherein the part of the token bucket algorithm judges that the received variable length packet can be read out from the packet buffer with a bandwidth less than the minimum guaranteed bandwidth when a quantity of tokens held in a token bucket is positive, and the part of the leaky bucket algorithm judges that the received variable length packet can be read out from the packet buffer with a bandwidth less than the maximum allowable bandwidth when a quantity of tokens held in a leaky bucket is zero, and wherein the control unit changes between .a maximum bandwidth priority mode in which the request selecting unit determines that the received variable length packet can not be read out from the packet buffer and a minimum bandwidth priority mode in which the request selecting unit determines that the received packet can be read out from the packet buffer when the first timing generator judges that the received variable length packet can be read out from the packet buffer with a bandwidth less than the minimum guaranteed bandwidth and the second timing generator also judges based upon the part of the leaky bucket algorithm that the received variable length packet can be read out from the packet buffer with a bandwidth exceeding the maximum allowable bandwidth, wherein the request selecting unit determines that the variable length packet can be read out from the packet buffer, when the first timing generator also judges based upon the part of the token bucket algorithm that the received variable length packet can be read out from the packet buffer with a bandwidth exceeding the minimum guaranteed bandwidth and concurrently the second timing generator judges based upon the part of the leaky bucket algorithm that the received variable length packet can be read out from the packet buffer with a bandwidth less than the maximum allowable bandwidth, wherein the request selecting unit, in response to determining that the received variable length packet can be read out from the packet buffer based upon the first determination made by the first timing generator and the second determination made by the second timing generator, sends a transmit approval signal to the packet switch that includes an indication that the received variable length packet is to be output, wherein the packet switch, in response to receiving the transmit approval signal, reads the received variable length packet from the packet buffer according to the indication included within the transmit approval signal, and wherein the interface sends the received variable length packet upon the received variable length packet being read from the packet buffer.

26. The network system according to claim 25, wherein the control unit switches whether each of the timing generations the first timing generator and the second timing generator is valid or invalid.

27. The network system according to claim 25, the bandwidth control unit further comprises a third timing generator for outputting the timing of packet transmission for transmitting the received variable length packet by best efforts control, wherein the control unit sets whether the timing generation by each of timing generators is valid or invalid.

28. The network system according to claim 25, wherein the bandwidth control unit further comprises:

a third timing generator for outputting the timing of packet transmission for transmitting the received variable length packet by best efforts control, and a validity holding unit for holding valid or invalid states of timing generation by each of the timing generators set by the control unit.

* * * * *